(12) United States Patent  
Kida

(10) Patent No.: US 6,314,267 B1  
(45) Date of Patent: Nov. 6, 2001

(54) IMAGE RECORDING SYSTEM, RECORDING MATERIAL POST-PROCESSING DEVICE, AND INTERMEDIATE UNIT

(75) Inventor: Hiroshi Kida, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/519,657

(22) Filed: Mar. 6, 2000

(30) Foreign Application Priority Data

Mar. 12, 1999  (JP) .................................................. 11-067313
Aug. 4, 1999   (JP) .................................................. 11-221662

(51) Int. Cl.[7] .................................................. G03G 15/00
(52) U.S. Cl. .......................... 399/405; 399/406; 399/407
(58) Field of Search ..................................... 399/391, 405, 399/406, 407, 410, 361; 271/279, 287, 300, 301, 302

(56) References Cited

U.S. PATENT DOCUMENTS 5,749,040 * 5/1998 Muramatsu ........................... 399/406
5,960,248 * 9/1999 Ohno ..................................... 399/410
6,112,047 * 8/2000 Kato et al. ........................ 399/405 X

FOREIGN PATENT DOCUMENTS 6100850   12/1994  (JP) .

* cited by examiner

Primary Examiner—Sophia S. Chen
Assistant Examiner—Hoan Tran
(74) Attorney, Agent, or Firm—Renner, Otto, Boisselle & Sklar, LLP

(57) ABSTRACT

An image recording system is made up of an image recording device which records images on recording material, and one or more peripheral devices selectively connected to the image recording device according to functions the image recording system is desired to perform; the peripheral devices including a recording material supply device which contains and supplies to the image recording device large-sized recording material, and which has a width which is in keeping with measurements of the large-sized recording material; in which the image recording device is structured so as to have a width which is in keeping with dimensions of small-sized recording material contained therein, and so that recording material with an image recorded thereon is discharged onto an upper surface of the image recording device, and is installed so as to fit within the extent of an upper surface of the recording material supply device.

33 Claims, 21 Drawing Sheets

IMAGE RECORDING SYSTEM, RECORDING MATERIAL POST-PROCESSING DEVICE, AND INTERMEDIATE UNIT

FIELD OF THE INVENTION

The present invention relates to an image recording system having superior expandability, for use in copy machines, printers, etc.

BACKGROUND OF THE INVENTION

Conventionally, image recording systems capable of responding to user demand have been offered, in which an image recording device main body is combined with peripheral devices, such as a paper supply unit which increases the number of paper supply trays, a post-processing device having functions such as sorting and stapling, etc., selected as desired according to the user's needs, the environment of use, etc.

For example, Japanese Examined Patent Publication No. 6-100850/1994 (Tokukohei 6-100850, published on May 15, 1987 as Japanese Unexamined Patent Publication No. 62-105159/1987 (Tokukaisho 62-105159)) discloses a structure in which a copy machine main body 101, shown in FIG. 22(a), can be upgraded to a full device shown in FIG. 22(b).

FIG. 22(a) shows a basic structure, in which the copy machine main body 101 is provided with a pressure plate 103, and with a discharge tray 104 of the paper-supply channel. 102a is a paper supply tray containing recording material of a small size, 102b is a paper supply tray containing recording material of a large size, and 105 is a hand-feed tray which can be freely opened and closed.

In FIG. 22(b), the copy machine main body 101 is provided with an automatic original supply device 110 in place of the pressure plate 103, and with a sorter 111 in place of the discharge tray 104. Further, the copy machine main body 101 is mounted on a double-sided processing device 112, which is in turn mounted on a table 113, and the double-sided processing device 112 is provided with a 250-sheet tray 102c. Further, the table 113 is provided with a paper bank 114, and the paper bank 114 is provided with a 1000-sheet tray 115 and a 250-sheet tray 102d. With this structure, it is possible to automatically perform double-sided recording of images from double-sided originals onto large- and small-sized recording material, and collating.

However, with the structure disclosed in the foregoing publication, as is evident from FIG. 22(a), even in the basic structure the paper supply trays 102a and 102b and the discharge tray 104 project from the copy machine main body 101, and thus installation requires a large width. Accordingly, if the copy machine main body 101 is combined with further peripheral devices, as shown in FIG. 22(b), installation width of the system becomes very large.

As a result, since the image recording system could only be installed in a limited number of locations in the office, and users had to go to the place of installation each time, a problem with the conventional art was inferior operability.

Further, in the current image recording device market, given an ever more digital office environment of network-linked terminal devices, there is increasing demand for image recording devices which can be installed nearby, so that when images are outputted from various terminal devices, the outputted images can be viewed near at hand.

SUMMARY OF THE INVENTION

It is an object of the present invention to provide an image recording system structured such that an image recording device can be assembled as a system in accordance with user needs and office environment, which is able to hold to a minimum the floor space required for installation of the assembled system, thereby increasing the range of installation locations in the office.

In order to attain the foregoing object, an image recording system according to the present invention is made up of an image recording device which records images on recording material (of small or large size), and one or more peripheral devices selectively connected to the image recording device according to functions the image recording system is desired to perform; the image recording device internally incorporating a recording material supply section containing recording material of a small size, and the peripheral devices including a recording material supply device which contains and supplies to the image recording device recording material of a size larger than the small-sized recording material, which has a width which is in keeping with measurements of the large-sized recording material; in which the image recording device is structured so that recording material with an image recorded thereon is discharged onto an upper surface of the image recording device, and has a width which is in keeping with measurements of the small-sized recording material, and is installed so as to fit within the extent of an upper surface of the recording material supply device.

Among peripheral devices installed for system upgrade of the image recording device, the device with the greatest structural width is a recording material supply device which supplies the image recording device with large-sized recording material of A3 or B4 size.

Accordingly, in the foregoing structure, the basic image recording device has a width which is in keeping with the measurements of the small-sized recording material used in the recording material supply section internally incorporated in the image recording device, and is structured so that recording material with an image recorded thereon is discharged onto the upper surface of the image recording device main body, and is installed so as to fit within the extent of the upper surface of the recording material supply device.

By providing such an image recording device above the recording material supply device, a space is formed above the recording material supply device adjacent to the image recording device. Further, by forming this space on the downstream side with respect to a paper discharge direction, it is possible to provide in this space a peripheral device other than the recording material supply device, such as a post-processing device (stapling device, sorter, etc.), and the peripheral devices other than the recording material supply device can be assembled together so as to substantially fit within the extent of the upper surface of the recording material supply device, which has the greatest width.

In this way, the width for installation of the image recording system can be held to the minimum necessary, and even if the system is upgraded, the installation width thereof can be substantially held to within the width of the recording material supply device. Thus, in the office, the image recording system can be installed nearby, such as at the side of a desk, and outputted images can be viewed easily, thus contributing to improvement of work efficiency.

Here, "width" means the dimension in the direction of paper discharge, and when the direction of paper discharge is parallel to the front of the device, means the width of the device when viewed from the front. Further, the "extent of the upper surface of the recording material supply device"

means a space above the recording material supply device, bounded by the upper surface of the recording material supply device and a cylinder whose generating line is the periphery of the upper surface.

In order to attain the foregoing object, another image recording system according to the present invention is made up of an image recording device which records images on recording material, and one or more peripheral devices selectively connected to the image recording device according to functions the image recording system is desired to perform; in which the peripheral devices include a double-sided transport device having a transport channel, which transports recording material from an upper end to a lower end of the transport channel, provided on a side of the image recording device; and a laterally located recording material post-processing device which receives recording material transported through the double-sided transport device, performs predetermined post-processing of the recording material received, and discharges the recording material post-processed, provided on a side of the image recording device so as to cover the double-sided transport device.

With this structure, since the laterally located recording material post-processing device is provided on the side of the image recording device so as to cover the double-sided transport device, members of the laterally located recording material post-processing device such as a control circuit for managing its operation, a power source unit for driving, etc. can be provided, for example, in the part of the laterally located recording material post-processing device not covering the double-sided transport device, i.e., the part below the double-sided transport device.

Consequently, installation space of the laterally located recording material post-processing device can be held to a minimum, thus also holding to a minimum increase of the installation area of the image recording system as a whole.

In order to attain the foregoing object, a further image recording system according to the present invention is made up of an image recording device which records images on recording material, and one or more peripheral devices selectively connected to the image recording device according to functions the image recording system is desired to perform; in which the peripheral devices include a double-sided transport device having a transport channel, which transports recording material from an upper end to a lower end of the transport channel, provided on a side of the image recording device; and a double-sided transport device recording material supply device, which forms at least part of the transport channel of the double-sided transport device, and supplies recording material to the transport channel.

With this structure, by forming part of the transport channel of the double-sided transport device using the double-sided transport device recording material supply device, which supplies recording material to the double-sided transport device, increase of installation space due to provision of the double-sided transport device recording material supply device can be held to a minimum.

Consequently, recording material can be supplied to the double-sided transport device without greatly increasing the installation of the image recording system as a whole.

In order to attain the foregoing object, a further image recording system according to the present invention is made up of an image recording device which records images on recording material; a first receiving section, which receives recording material with an image recorded thereon discharged by the image recording device; a second receiving section, which receives recording material with an image recorded thereon discharged by the image recording device, provided on an opposite side of the image recording device from the first receiving section; and a first receiving section transport channel, which transports recording material toward the first receiving section; in which the first receiving section transport channel is also used as a first switchback transport channel for introducing recording material into the second receiving section, and is provided with curl correction means for correcting curl of recording material.

With this structure, curl in recording material discharged from the image recording device to the first receiving section is corrected by the curl correction means when the recording material passes through the first receiving section transport channel. Further, since recording material discharged to the second receiving section on the opposite side of the image recording device from the first receiving section passes through the first receiving section transport channel during switchback transport, the curl correction means correct curl of this recording material as well.

Consequently, a single curl correction means can correct curl both of recording material transported from the image recording device toward the first receiving section, and of recording material transported from the image recording device toward the second receiving section.

A recording material post-processing device according to the present invention receives from an image recording device recording material with an image recorded thereon, performs predetermined post-processing of the recording material received, and discharges the recording material post-processed, in which the recording material post-processing device includes a device main body section capable of being provided on an upper surface of a recording material supply device having a width which is in keeping with measurements of large-sized recording material contained therein and supplied to the image recording device thereby, in a parallel arrangement with an image recording device having a width which is in keeping with measurements of small-sized recording material smaller than the large-sized recording material, also provided on the upper surface of the recording material supply device.

By use of the recording material post-processing device structured as above, it is easy to realize an image recording system like that described above, provided with a recording material post-processing device which receives from an image recording device recording material with an image recorded thereon, performs predetermined post-processing of the recording material received, and discharges the recording material post-processed.

An intermediate unit according to the present invention is installed on an upper surf ace of an image recording device which discharges recording material with an image recorded thereon to the foregoing upper surface, and is an intermediary in transport of recording material with an image recorded thereon toward a recording material post-processing device; the intermediate unit including a first transport channel which transports recording material with an image recorded thereon toward a recording material post-processing device, and a second transport channel which guides recording material with an image recorded thereon to an upper surface of an intermediate unit main body through an opening provided therein.

By use of the intermediate unit structured as above, it is easy to realize an image recording system provided with an intermediate unit like that described above.

Additional objects, features, and strengths of the present invention will be made clear by the description below.

Further, the advantages of the present invention will be evident from the following explanation in reference to the drawings.

DESCRIPTION OF THE EMBODIMENTS

Figure 1:
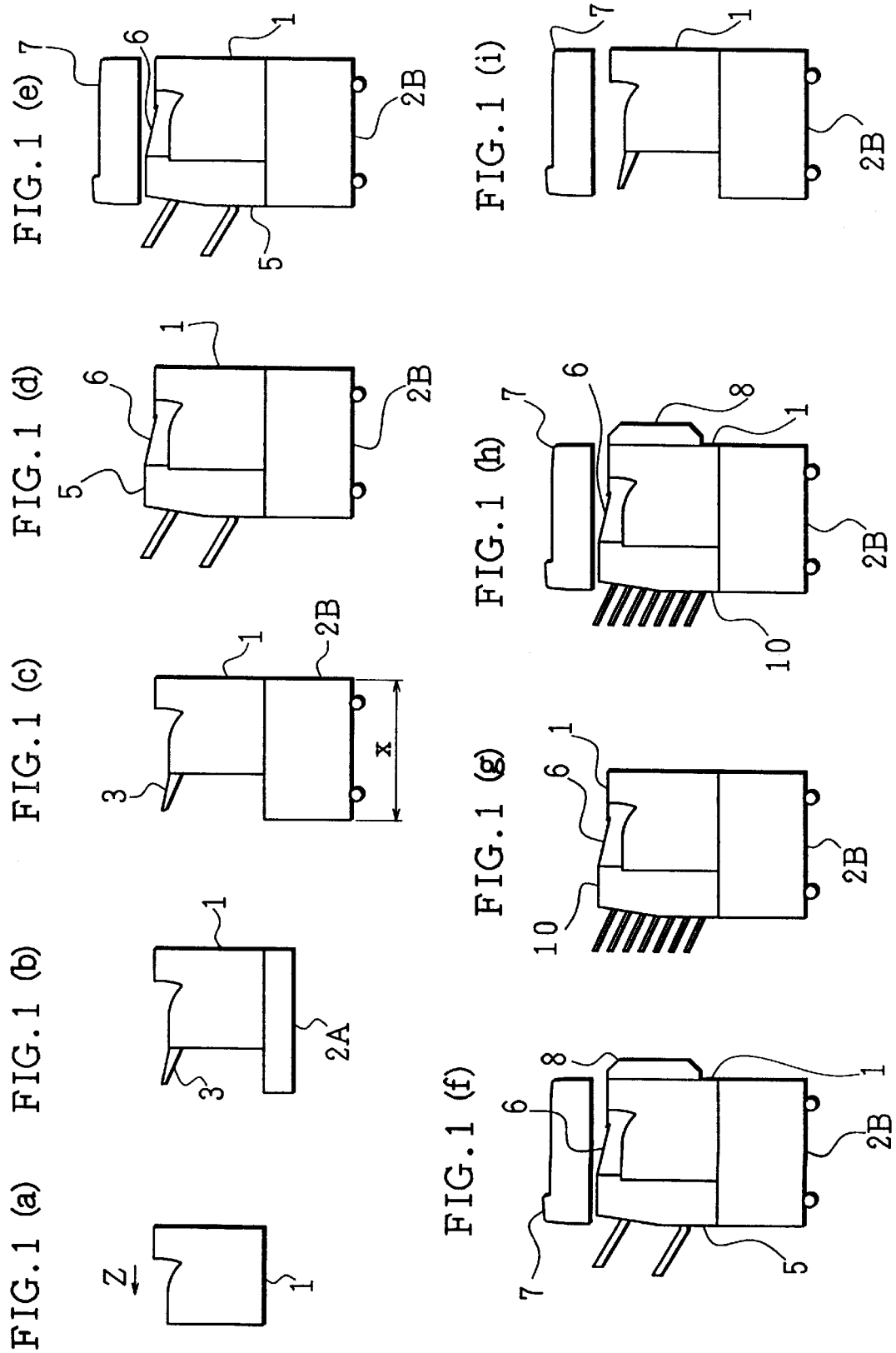
FIGS. 1(a) through 1(i) are schematic drawings showing examples of embodiments of the image recording system according to the present invention.

The following will explain embodiments of the present invention with reference to FIGS. 1(a) through 21.

The image recording system according to the present invention is characterized in that an image recording device, having basic image recording functions and capable of internally containing recording material of a standard small size, can be combined with various peripheral devices engaging therewith, to form a system which meets user needs.

In other words, a power source of the image recording device is capable of supplying current sufficient for the various peripheral devices of the largest structure realizable by system upgrade, and gears for directly driving the peripheral devices and connectors for supplying electrical signals thereto are provided as needed, so as to enable connection of the peripheral devices. Further, depending on the kind of peripheral device, a peripheral device may have its own motor, and this type of motor is driven by electrical signals supplied via a connector. Depending on the kind of peripheral device, it is also possible to structure a peripheral device so that it has its own power source.

FIGS. 1(a) through 1(i) show examples of installation of various peripheral devices on an image recording device 1. These will be discussed in detail later, but a brief explanation follows.

In FIG. 1(a), the image recording device 1, which is the basis of the system, is shown alone. The image recording device 1 internally incorporates a paper supply cassette (recording material supply section) containing recording material of a small size, and, when connected to an image processing device such as a personal computer, functions as a printer for outputting onto recording material image information sent from the image processing device.

FIG. 1(b) shows a system designed to increase paper supply versatility, in which a paper supply unit 2A (recording material supply device) including a paper supply cassette capable of containing recording material of a size larger than the recording material contained in the paper supply cassette internally incorporated in the image recording device 1 is provided below the image recording device 1, with the image recording device 1 mounted on the upper surface of the paper supply unit 2A, and a discharge tray installed on the left side of the image recording device 1. With this structure, it is possible to use recording material of a size larger than the recording material contained in the image recording device 1.

FIG. 1(c) shows a system designed to further increase paper supply versatility, in which the paper supply unit 2A of FIG. 2(b) is replaced by a multi-stage paper supply unit 2B (recording material supply device) having a plurality of paper supply cassettes, including a paper supply cassette capable of containing large-sized recording material. With this structure, large-sized recording material of different sizes can be contained in the different paper supply cassettes of the multi-stage paper supply unit 2B, and thus it is possible to use recording material of different sizes without exchanging recording material or paper supply cassettes.

FIG. 1(d) shows a system further provided with a stapling device 5, which staples and discharges recording material, provided in the space where the discharge tray 3 of FIG. 1(c) projected, and with an intermediate unit 6 installed on the upper surface of the image recording device 1. With this structure, it is possible to automatically perform stapling of recording material after image recording.

FIG. 1(e) shows the system of FIG. 1(d), further provided with an original image reading device 7. With this structure, an original image can be read, thus giving the system the function of a copy machine.

FIG. 1(f) shows the system shown in FIG. 1(e), further provided with a double-sided transport unit 8 (double-sided transport device) enabling double-sided transport of recording material, mounted on the right side of the image recording device 1, and thus shows the system including the stapling device 5 provided with the full complement of peripheral devices. With this structure, image recording can be performed on both sides of recording material.

FIG. 1(g) shows a system in which the stapling device 5 of FIG. 1(d) is replaced by a sorter 10, which automatically performs collating, sorting, etc. With this structure, collating, sorting, etc. can be performed automatically. FIG. 1(h) shows the system including the sorter 10 provided with the full complement of peripheral devices.

Further, FIG. 1(i) shows the system of FIG. 1(c), further provided with the original image reading device 7. This structure can be called the basic structure for a copy machine capable of handling recording material of different sizes.

The system examples shown in FIGS. 1(a) through 1(i) are merely examples, and various combinations are possible.

The following will explain in detail, with reference to FIGS. 2 through 10, the structures of the image recording device 1 and of the various units for installation thereon.

Figure 2:
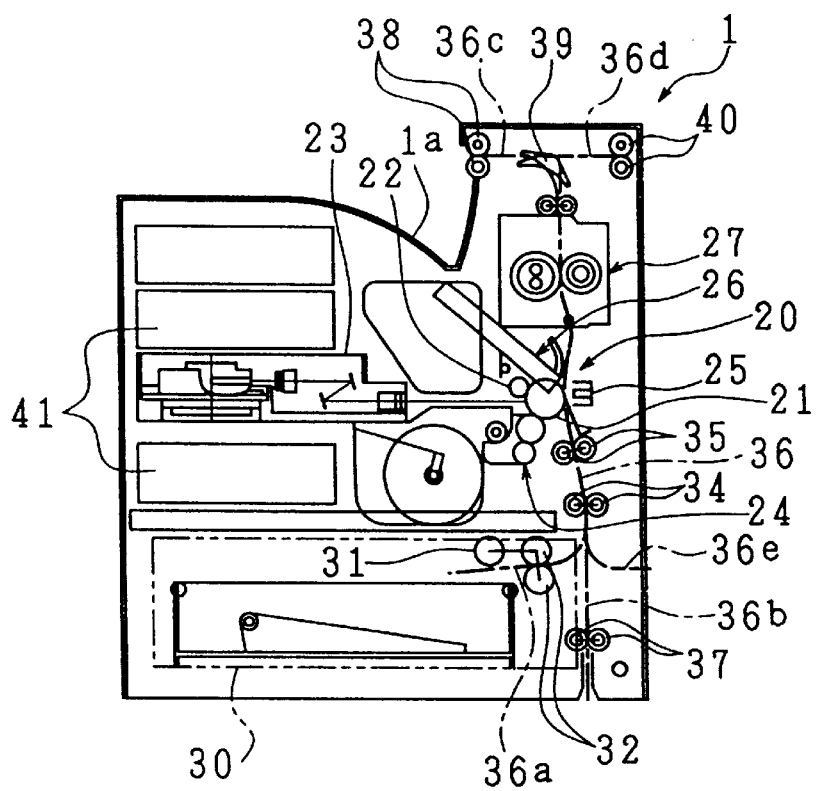
FIG. 2 is a cross-sectional view showing one example of a structure for an image recording device used in the image recording system according to the present invention.

First, the image recording device 1 will be explained with reference to FIG. 2. FIG. 2 is a cross-sectional view showing the structure of the image recording device 1.

Substantially in the center and toward the right side of the image recording device 1 is provided an electrophotographic process section 20 centered on a photosensitive drum 21. Around the periphery of the photosensitive drum 21 are provided a charging roller 22 which uniformly charges the surface of the photosensitive drum 21, an optical scanning unit 23 which forms an optical image onto the uniformly charged surface of the photosensitive drum 21 by scanning the uniformly charged surface to write an electrostatic latent image thereon, a developing unit 24 which recreates a visible image from the electrostatic latent image written by the optical scanning unit 23 using a developing agent, and a transfer unit 25 which transfers the visible image recreated on the photosensitive drum 21 onto recording material, in that order. In short, in the electrophotographic process section 20, a visible image is recreated on recording material.

Around the periphery of the photosensitive drum 21 are also provided a cleaning unit 26 which removes developing agent remaining on the photosensitive drum 21 after transfer, thereby enabling a new image to be recreated thereon, a charge eliminating lamp unit (not shown) which eliminates charge from the surface of the photosensitive drum 21, etc.

In the lower part of the image recording device 1 is provided a paper supply cassette 30 (enclosed by two-dot-and-dash lines in FIG. 2) capable of containing recording material of up to A4 size. A pickup roller 31 and a pair of paper supply rollers 32 provided in an upper part of the paper supply cassette 30 separate and supply one sheet at a time from the recording material contained in the paper supply cassette 30, and a pair of transport rollers 34 send the sheet through a transport channel 36 (shown by a single-dot-and-dash line in FIG. 2) to be supplied to the electrophotographic process section 20.

Immediately before the electrophotographic process section 20 is provided a pair of resist rollers 35 for controlling the timing with which the recording material is supplied, which supply the recording material between the photosensitive drum 21 and the transfer unit 25 with a predetermined timing.

The paper supply cassette 30 is structured so that it can be pulled out from the front of the main body of the image recording device 1 (in FIG. 2, out of the plane of the drawing toward the viewer), and operations such as refill and exchange of recording material can be performed by pulling out the paper supply cassette 30.

The transport channel 36 splits into three channels below the transport rollers 34: a transport channel 36a extending to the paper supply cassette 30, a transport channel 36b extending to the lower surface of the image recording device 1, and a transport channel 36e extending to a side (in FIG. 2, the right side) of the image recording device 1.

The transport channel 36b has a pair of transport rollers 37, and enables introduction into the transport channel 36 of recording material supplied from the paper supply unit 2A or 2B when either of these units is installed below the image recording device 1.

The transport channel 36e enables introduction into the transport channel 36 of recording material which has been turned over and sent through the double-sided transport unit 8 when this unit is installed on the right side (in FIG. 2) of the image recording device 1.

Above the electrophotographic process section 20 is provided a fixing unit 27, which successively receives sheets of recording material to which images have been transferred, and heat-fixes the developing agent on the recording material.

Above the fixing unit 27 is provided a switching gate 39, which switches direction of transport of recording material traveling through the transport channel 36 after fixing. The switching gate 39 switches a transport channel for transport of recording material between a transport channel 36c, extending toward a discharge section 1a provided with a pair of discharge rollers 38, and a transport channel 36d extending in the opposite direction.

When the double-sided transport unit 8 is installed on the image recording device 1 and recording material is to be turned over and introduced into this unit, the switching gate 39 introduces the recording material from the transport channel 36c into the transport channel 36d. Accordingly, the discharge rollers 38 are reversible rollers. In the downstream transport direction in the transport channel 36d is provided a pair of discharge rollers 40, which introduce the recording material into the double-sided transport unit 8.

The upper surface of the main body of the image recording device 1 is formed into a discharge section 1a for receiving recording material discharged to the exterior of the image recording device 1 by the discharge rollers 38, which has an incline which enables stacking of the sheets of recording material with the front ends even. Recording material guided into the transport channel 36c by the switching gate 39 and discharged to the exterior of the image recording device 1 by the discharge rollers 38 is supported by the discharge section 1a.

In spaces above and below the optical scanning unit 23 is a substrate section 41 including a plurality of substrates. In the substrate section 41 are provided a process control unit (PCU) substrate which controls the electrophotographic process section 20, an interface substrate which receives image data from outside the device, an image control unit (ICU) substrate which performs predetermined processing of image data received by the interface substrate, and records the image data as an image by scanning by the optical scanning unit 23, and a power source unit which supplies power to these substrates and to the various units of the image recording device 1.

The foregoing explained a case in which a single paper supply cassette 30 is internally incorporated in the image recording device 1 main body, but a structure which internally incorporates a plurality of paper supply cassettes 30 is also possible.

Figure 3:
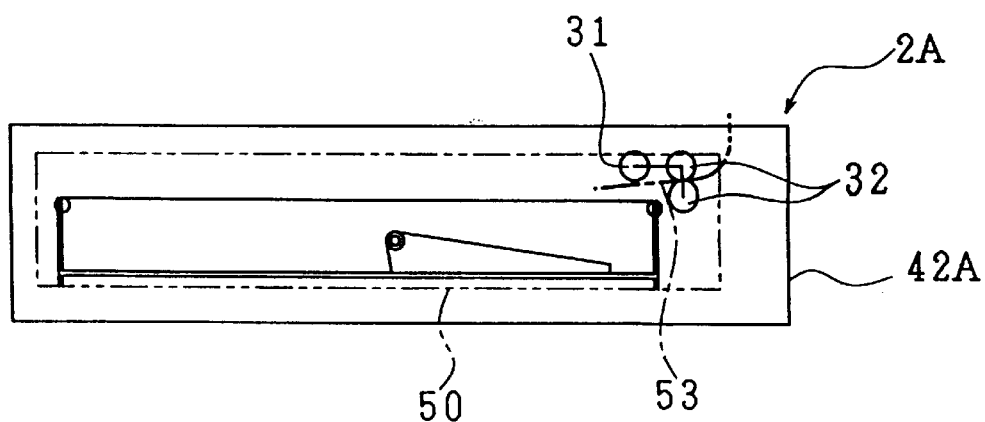
FIG. 3 is a cross-sectional view showing one example of a structure for a paper supply unit used in the image recording system according to the present invention.
Figure 4:
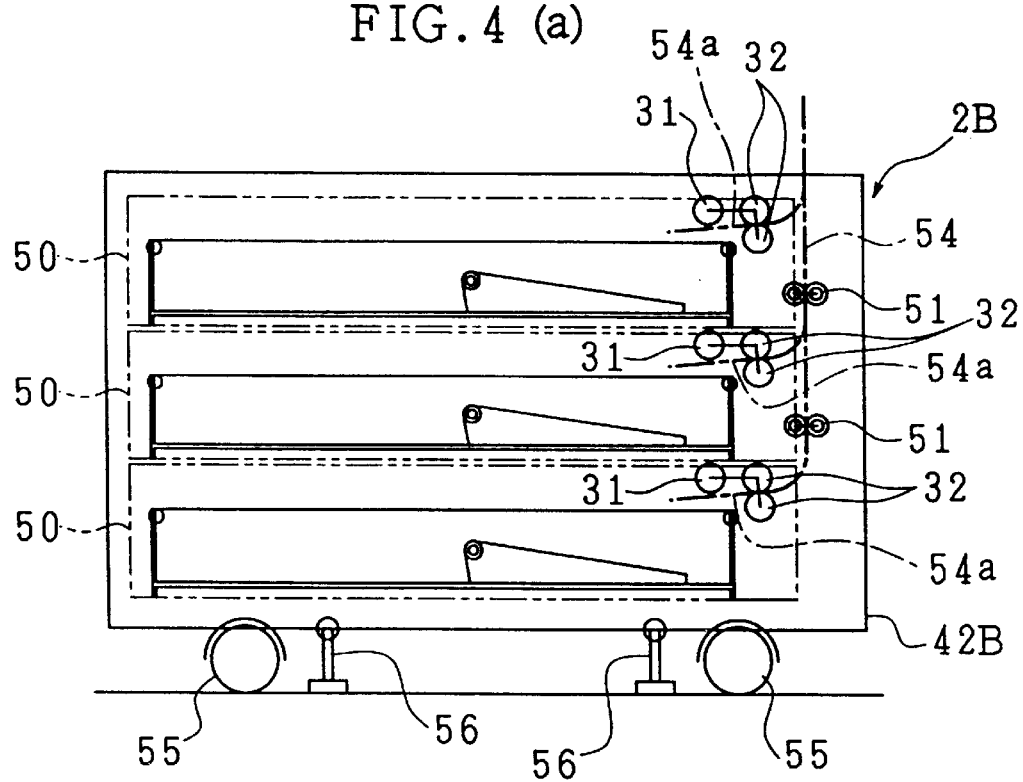
FIGS. 4(a) and 4(b) are cross-sectional views showing examples of structures for a paper supply unit used in the image recording system according to the present invention.
Figure 4:
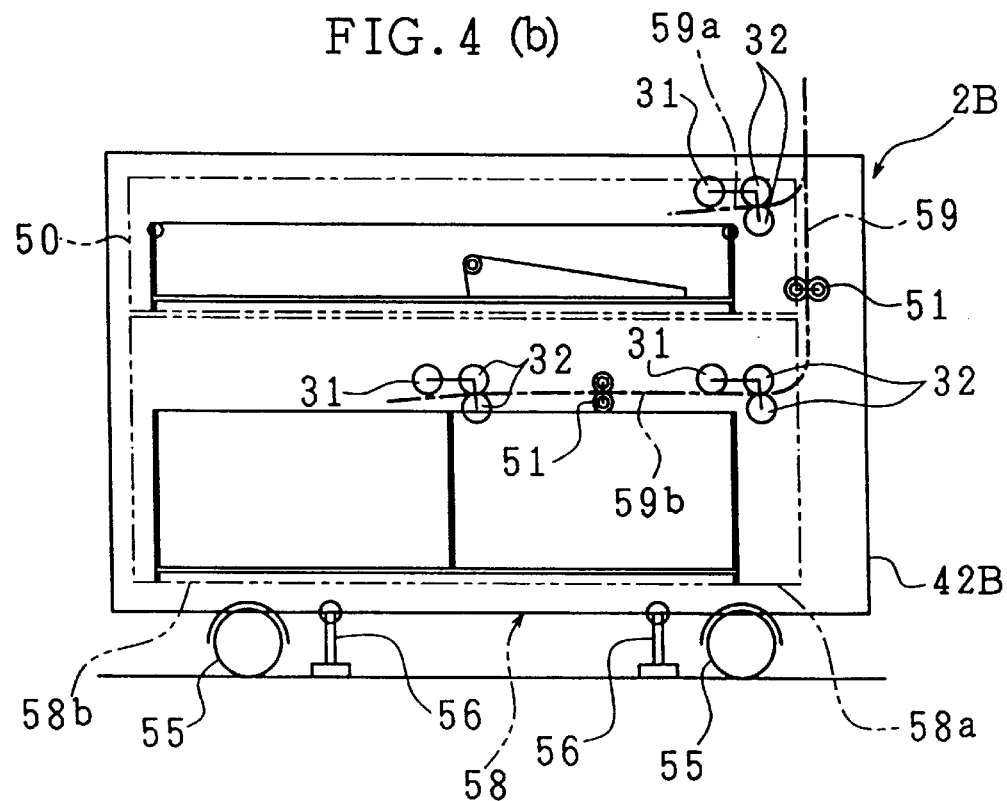

Next, the paper supply unit 2A will be explained with reference to FIG. 3. FIG. 3 is a cross-sectional view showing the structure of the paper supply unit 2A.

The paper supply unit 2A has a unit main body 42A, which includes a single paper supply cassette 50 capable of containing recording material of a size (for example up to A3 size) which is larger than the recording material contained in the paper supply cassette 30 internally incorporated in the image recording device 1 shown in FIG. 2.

The paper supply cassette 50 is provided with a pickup roller 31 and a pair of paper supply rollers 32, which separate one sheet at a time from the recording material in the paper supply cassette 50 and supply it into a transport channel 53.

The transport channel 53 extends to the upper surface of the paper supply unit 2A to reach the transport channel 36b of the image recording device 1 when the image recording device 1 is mounted on and connected to the paper supply unit 2A. In this way, recording material in the paper supply cassette 50 can be transported to the electrophotographic process section 20.

The paper supply cassette 50 is structured so that it can be pulled out from the front of the main body of the paper supply unit 2A (in FIG. 3, out of the plane of the drawing toward the viewer), and operations such as refill and exchange of recording material can be performed by pulling out the paper supply cassette 50.

Next, two configurations for a multi-stage paper supply unit 2B will be explained with reference to FIGS. 4(a) and 4(b). FIGS. 4(a) and 4(b) are cross-sectional structural views.

First, the paper supply unit 2B shown in FIG. 4(a) is of a type in which several sizes of recording material can be simply used, and has a unit main body 42B which includes three paper supply cassettes 50 like that shown in FIG. 3, stacked vertically.

By operation of a pickup roller 31 and a pair of transport rollers 32 corresponding to a selected paper supply cassette 50, one sheet at a time is separated from the recording material in the selected paper supply cassette 50 and supplied through a transport channel 54a into a transport channel 54, where pairs of transport rollers 51 transport the sheet upwards.

The transport channel 54, like the transport channel 53 in the paper supply unit 2A shown in FIG. 3, extends to the upper surface of the paper supply unit 2B to reach the transport channel 36b of the image recording device 1 when the image recording device 1 is mounted on and connected to the paper supply unit 2B. In this way, recording material can be transported from the paper supply unit 2B to the electrophotographic process section 20.

The paper supply unit 2B shown in FIG. 4(b), on the other hand, has a unit main body 42B including a single paper supply cassette 50 containing large-size recording material, below which is provided a paper supply cassette 58 made up of a parallel arrangement of a cassette section 58a and a cassette section 58b, each capable of containing small-sized recording material.

Each of the cassette sections 58a and 58b of the paper supply cassette 58 is provided with a pickup roller 31 and a pair of paper supply rollers 32, which separate and supply one sheet at a time from the recording material contained in the corresponding cassette section, so that when one of the cassette sections 58a and 58b is selected, only the pickup rollers 31 and paper supply rollers 32 corresponding to the selected cassette section operate, thus supplying recording material from the selected cassette section.

Supplied recording material passes through a transport channel 59b provided with a pair of transport rollers 51, enters a transport channel 59 which extends to the transport channel 36b of the image recording device 1 when the image recording device 1 is mounted on and connected to the paper supply unit 2B, and is transported to the electrophotographic process section 20.

Here, a structure for separating one sheet at a time from the recording material in the paper supply cassette 50 is the same as in the paper supply unit 2B shown in FIG. 4(a), and accordingly explanation thereof will be omitted.

Further, in each of the foregoing paper supply units 2B, as in the paper supply unit 2A, the paper supply cassettes 50 and 58 are structured so that they can be pulled out from the front of the main body of the paper supply unit 2B (in the Figures, out of the plane of the drawing toward the viewer), and operations such as refill and exchange of recording material can be performed by pulling out the paper supply cassettes 50 and 58.

Further, since the paper supply unit 2B provided with a plurality of paper cassettes 50 and 58 has greater volume and weight than the paper supply unit 2A, the bottom of the paper supply unit 2B is provided with casters 55 to facilitate movement, and with stoppers 56 for fixing in place.

Incidentally, there is no limitation on the number of paper cassettes 50 containing large-sized recording material which may be provided in either of the paper supply units 2B explained above, nor on the number of cassette sections which may be provided in the paper supply cassette 58.

Figure 5:
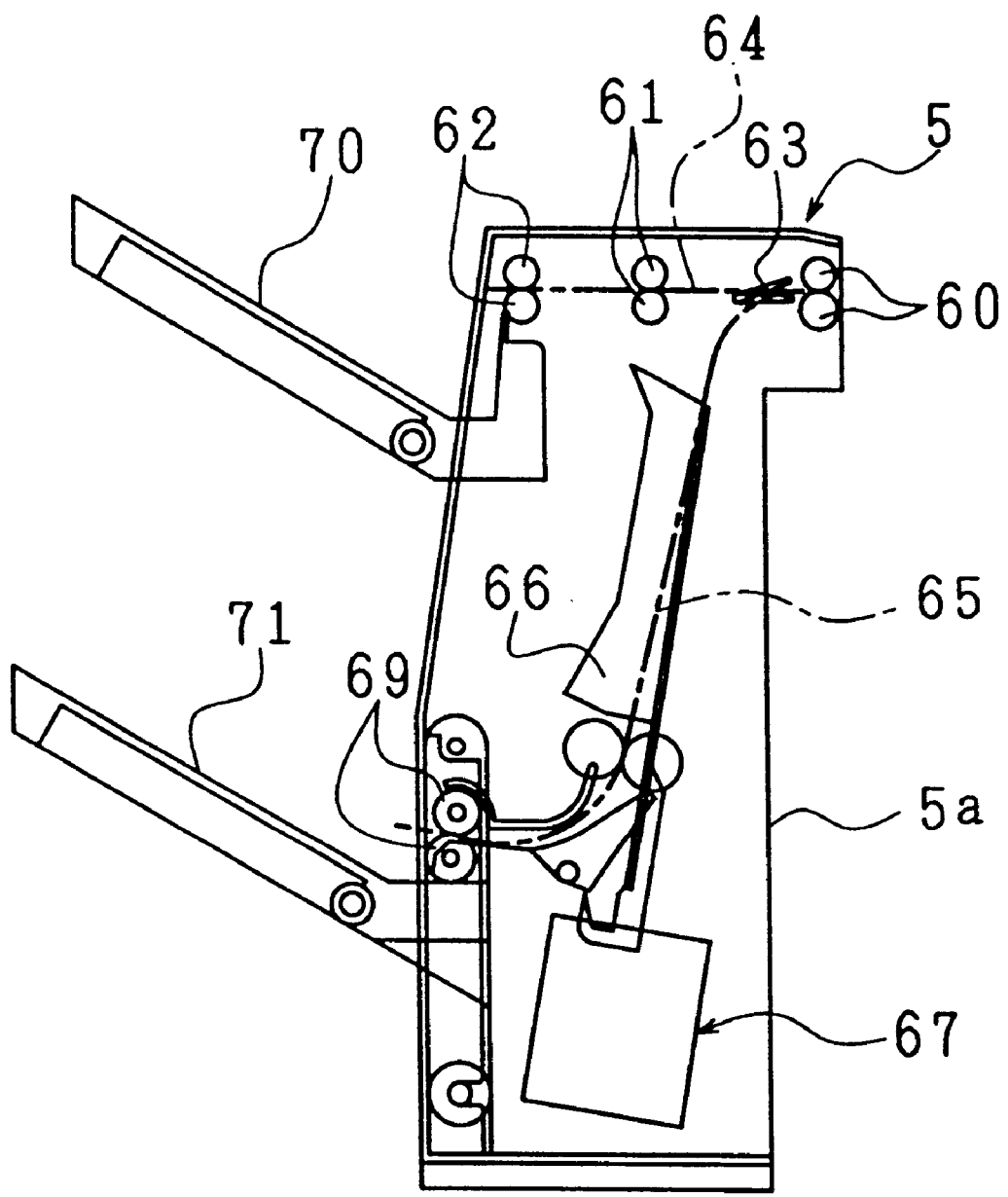
FIG. 5 is a cross-sectional view showing one example of a structure for a stapling device used in the image recording system according to the present invention.

Next, a stapling device 5, which is one possible recording material post-processing device, will be explained with reference to FIG. 5. FIG. 5 is a cross-sectional view showing the structure of the stapling device 5.

The stapling device 5 is installed next to the image recording device 1 shown in FIG. 2, on the left side thereof (downstream from the image recording device 1 with respect to a discharge direction), and has a pair of introducing rollers 60 for introducing into the interior of the stapling device 5 recording material which has undergone image recording in the image recording device 1.

Downstream from the introducing rollers 60 with respect to the discharge direction is provided a switching gate 63, which, in accordance with a mode indicated by the user, selectively switches the transport channel of the recording material between a transport channel 64, in which stapling is not performed, and a transport channel 65 leading to a stapling processing section 67.

Recording material guided into the transport channel 64 by the switching gate 63 is discharged, without undergoing any processing, by action of a pair of transport rollers 61 and a pair of discharge rollers 62, into an upper discharge tray 70.

Recording material guided into the transport channel 65 by the switching gate 63, on the other hand, is temporarily stacked in a processing tray 66 provided in the transport channel 65. Below the processing tray 66 is provided a stapling processing section 67, which, when a set number of sheets of recording material have been stacked in the processing tray 66, staples the stack of recording material. Thereafter, the stapled stack of recording material is discharged by action of a pair of discharge rollers 69 into a lower discharge tray 71.

Here, the roller pairs 60, 61, and 62, the switching gate 63, the processing tray 66, and the stapling processing section 67 are provided within a main body 5a (main part) of the stapling device 5, and the discharge trays 70 and 71 project out from the main body 5a.

Figure 6:
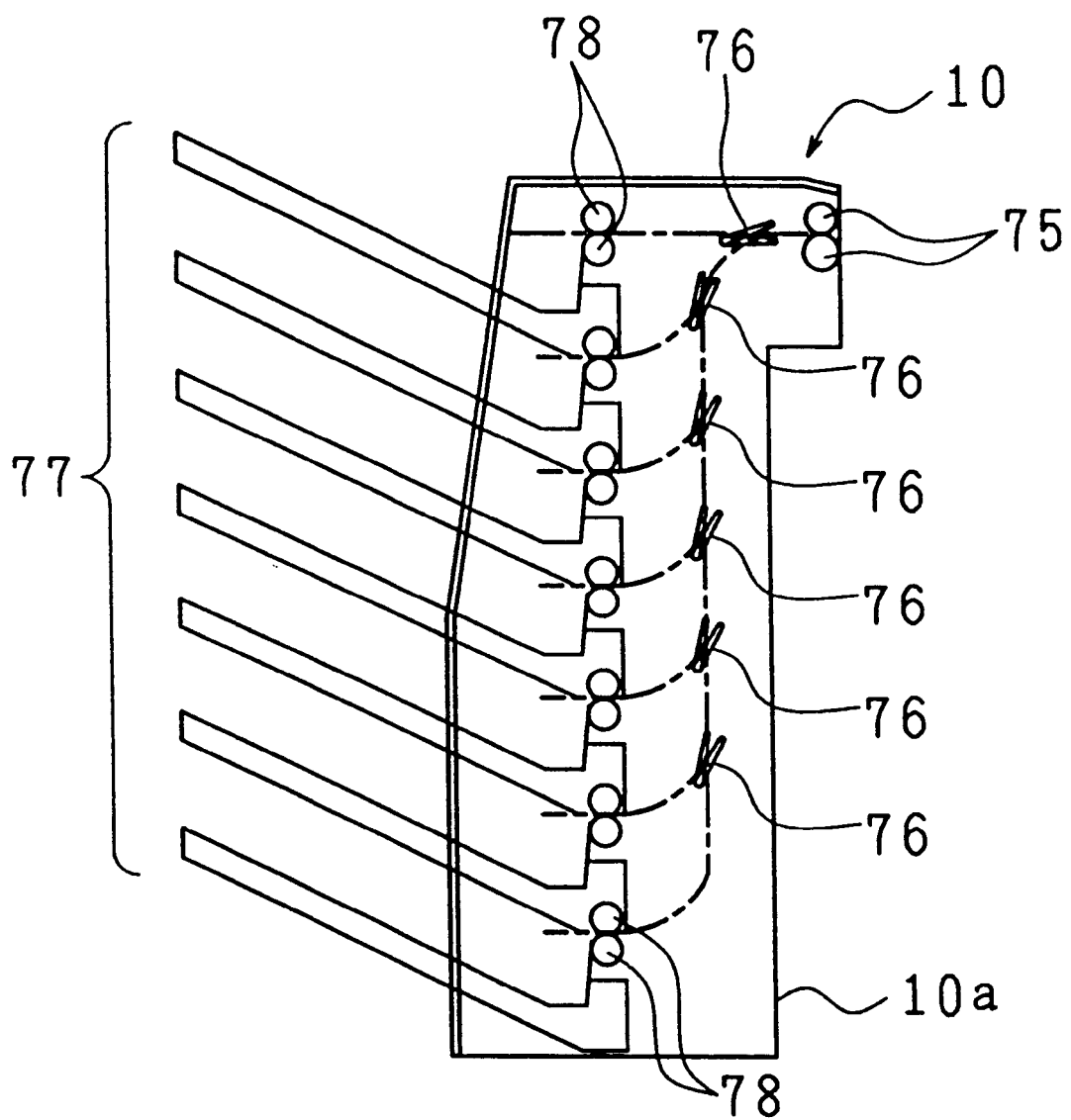
FIG. 6 is a cross-sectional view showing one example of a structure for a sorter used in the image recording system according to the present invention.

Next, a sorter 10, which is another possible recording material post-processing device, will be explained with reference to FIG. 6. FIG. 6 is a cross-sectional view showing the structure of the sorter 10.

Like the stapling device 5 shown in FIG. 5, the sorter 10 is installed next to the image recording device 1, on the left side thereof. Recording material which has undergone image recording in the image recording device 1 is introduced into the interior of the sorter 10 by a pair of introducing rollers 75. In the downstream discharge direction in the sorter 10 are provided a plurality of bins 77, and recording material is separated and discharged into the respective bins 77.

Discharge of recording material into the bins 77 is performed by action of a plurality of switching gates 76 provided downstream from the introducing rollers 75 with respect to the discharge direction, with each bin 77 being provided with a switching gate 76 and a pair of discharge rollers 78.

Here, the transport rollers 75 and the switching gates 76 are provided within a main body 10a (main part) of the sorter 10, and the bins 77 project out from the main body 1a.

Figure 7:
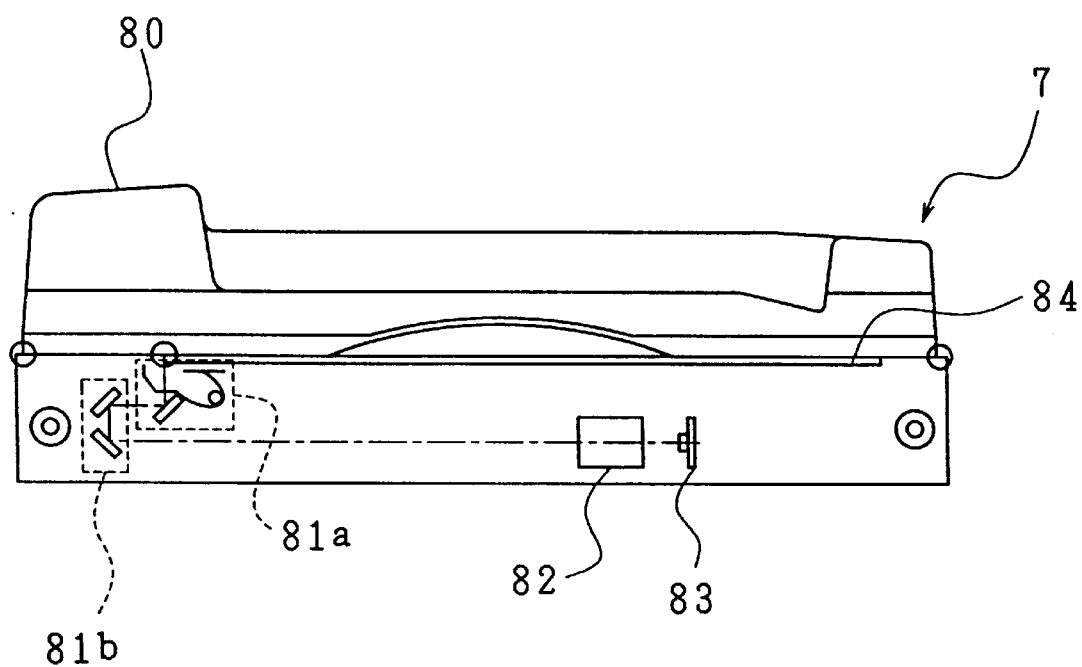
FIG. 7 is a cross-sectional view showing one example of a structure for an original image reading device used in the image recording system according to the present invention.

Next, an original image reading device 7 will be explained with reference to FIG. 7. FIG. 7 is a cross-sectional view showing the structure of the original image reading device 7.

The original image reading device 7 includes an original placement plate 84, which is transparent, beneath which are provided first and second scanning units 81a and 81b, which move back and forth along the lower surface of the original placement plate 84 and expose and scan the image of an original placed thereon, an optical lens 82, and a photoelectric conversion element 83 made of a CCD for converting light reflected from the original into electrical signals.

The first scanning unit 81a is made up of an exposing lamp and a mirror, and the second scanning unit 81b is made up of a plurality of mirrors. The optical lens 82 focuses the reflected optical image onto the photoelectric conversion element 83.

Further, the original image reading device 7 includes an automatic original supply device 80, which automatically supplies sheet-type originals to the top of the original placement plate 84.

By this means, the original image reading device 7 has an automatic reading mode, in which original images are read by automatic exposure and scanning of originals one sheet after another, and a manual reading mode, in which original images are read by manually setting a book-type original, or a sheet-type original which cannot be automatically supplied by the automatic original supply device 80.

Figure 8:
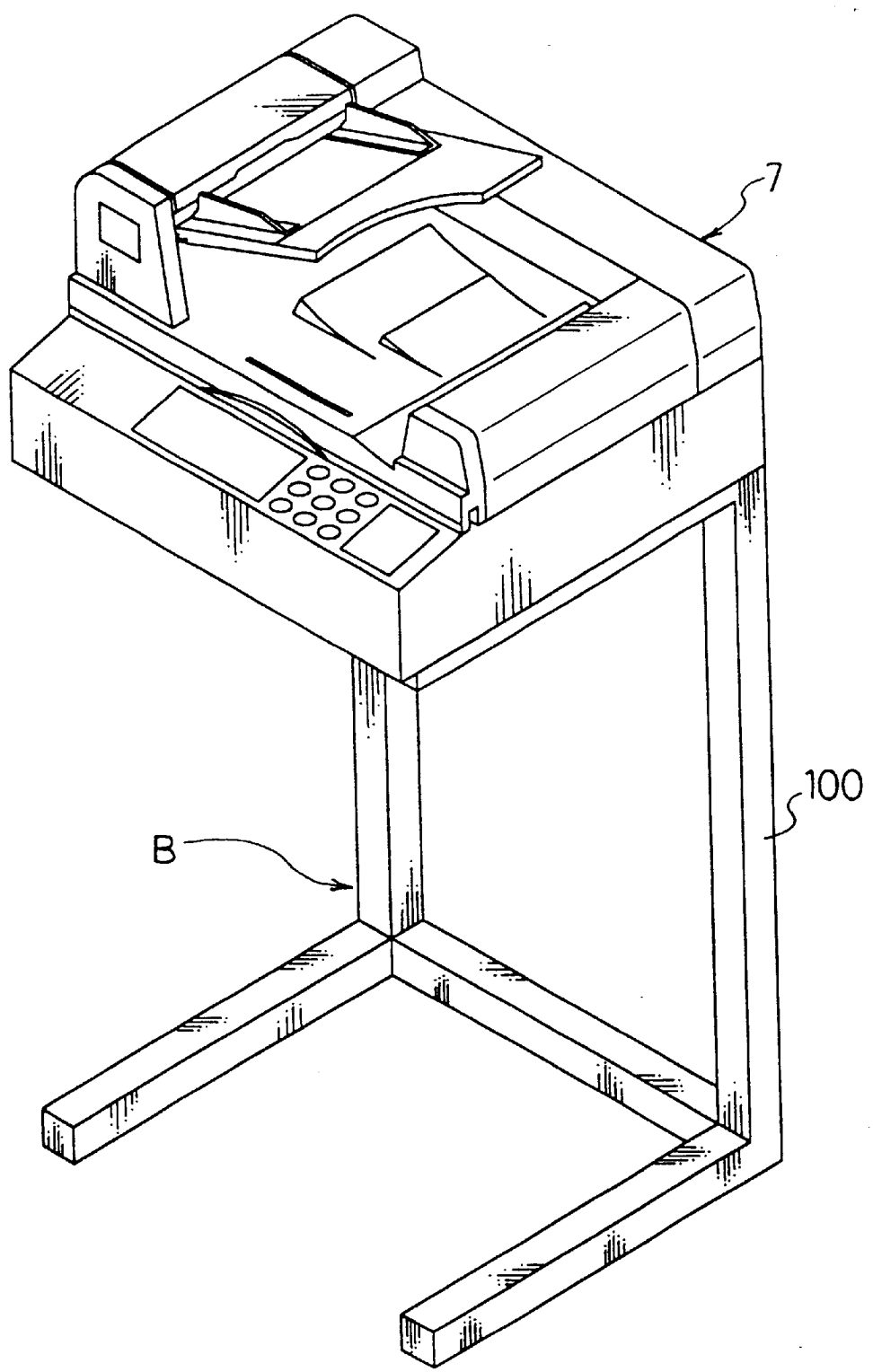
FIG. 8 is a perspective view showing one example of a system rack for mounting an original image reading device used in the image recording system according to the present invention.

FIG. 8 shows a system rack 100 for installing the original image reading device 7 above the image recording device 1. The system rack 100 supports the original image reading device 7 a fixed distance from the upper surface of the image recording device 1. The image recording device 1, along with the paper supply unit 2A or 2B, a recording material post-processing device such as the stapling device 5 or the sorter 10, etc., are contained in a space B of the system rack 100.

Figure 9:
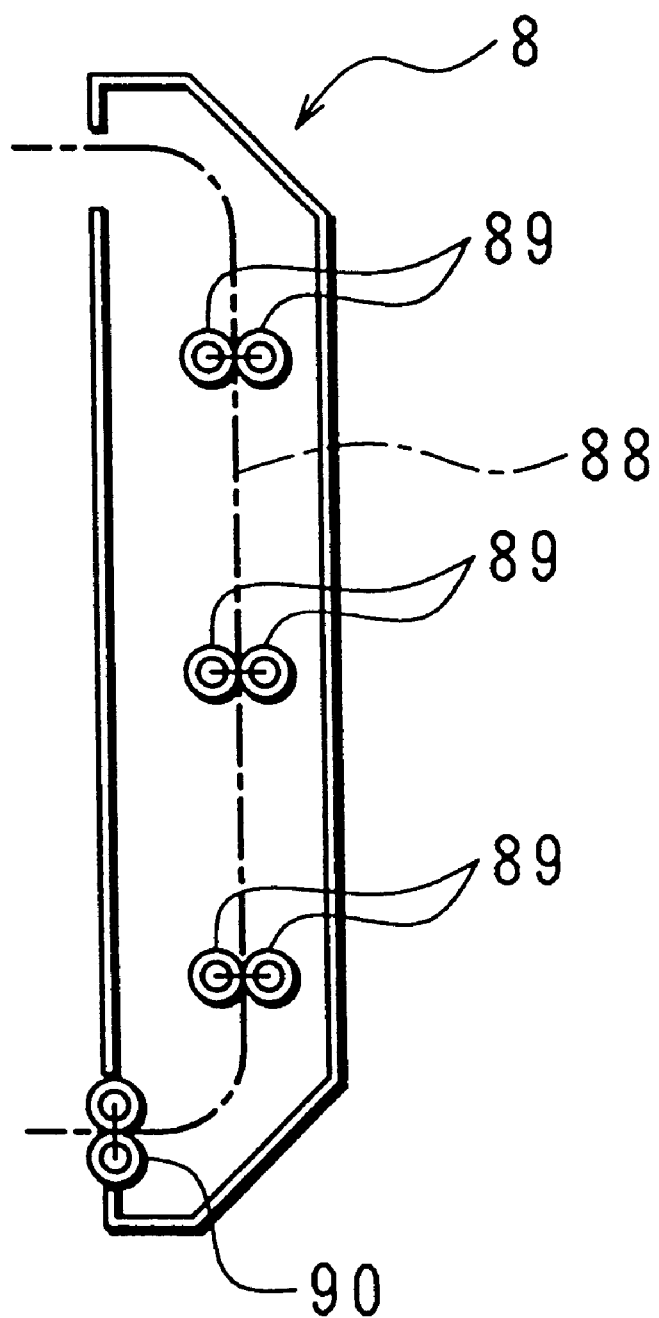
FIG. 9 is a cross-sectional view showing one example of a structure for a double-sided transport unit used in the image recording system according to the present invention.

Next, a double-sided transport unit 8 will be explained with reference to FIG. 9. FIG. 9 is a cross-sectional view showing the structure of the double-sided transport unit 8.

The double-sided transport unit 8 is installed on the right side of the image recording device 1 shown in FIG. 2, and is a recording material transport unit for re-supplying to the space between the photosensitive drum 21 and the transfer unit 25 (transfer section) of the photoelectric process section 20 of the image recording device 1 recording material discharged from the fixing unit 27 with an image recorded on one side, after this recording material has been turned over.

The interior of the double-sided transport unit 8 is provided with three pairs of transport rollers 89 along a transport channel 88, and with a pair of discharge rollers 90 at the downstream end thereof, which, when the double-sided transport unit 8 is installed on the side of the image recording device 1, introduce recording material which has been transported through the transport channel 88 into the transport channel 36e leading to the electrophotographic process section 20 of the image recording device 1.

Figure 10:
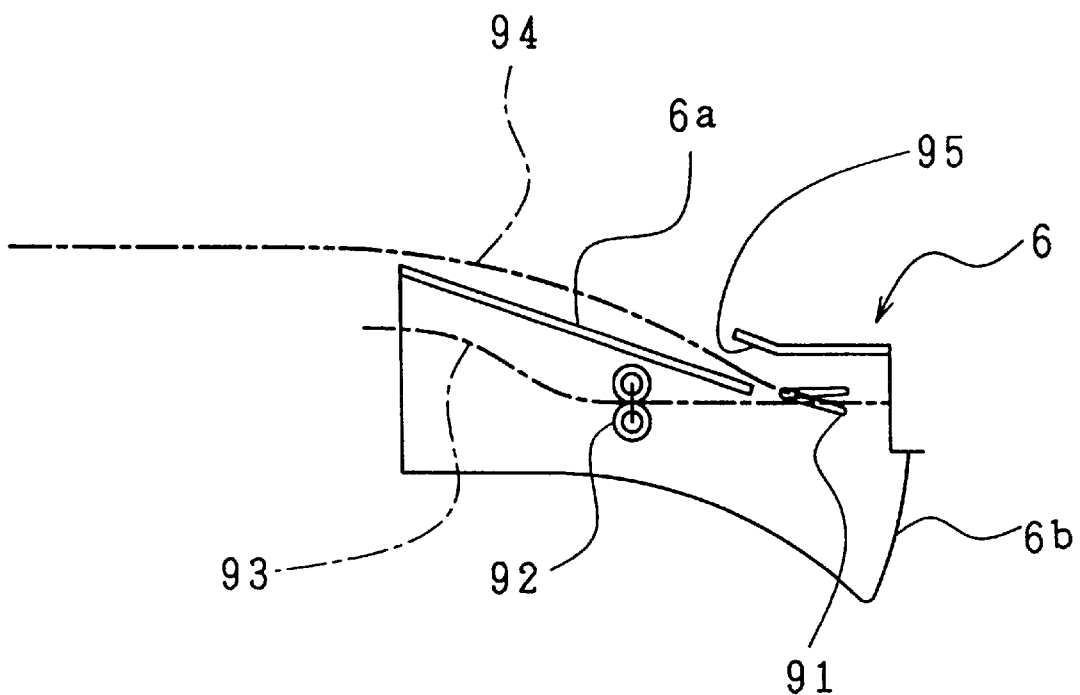
FIG. 10 is a cross-sectional view showing one example of a structure for an intermediate unit used in the image recording system according to the present invention.

Next, an intermediate unit 6 will be explained with reference to FIG. 10. FIG. 10 is a cross-sectional view showing the structure of the intermediate unit 6.

When a post-processing device such as the stapling device 5 or the sorter 10 (shown in FIGS. 5 and 6, respectively) is provided, the intermediate unit 6 is installed in the discharge section 1a of the image recording device 1 shown in FIG. 2.

The intermediate unit 6 is provided with a pair of transport rollers 92, and with a transport channel 93 extending from the upstream side to the downstream side with respect to a discharge direction. Recording material discharged from the image recording device 1 with an image recorded thereon passes through the transport channel 93 and is introduced into the post-processing device.

Further, an upper surface 6a of an intermediate unit main body 6b (the main body of the intermediate unit 6) is provided with a discharge outlet 95, and in the transport channel 93 in the vicinity of the discharge outlet 95 is provided a switching gate 91 which is selectively driven, by means of which recording material can be guided into a transport channel 94 and discharged from the discharge outlet 95 to an upper surface 6a of the intermediate unit main body 6b.

The upper surface 6a of the intermediate unit main body 6b is provided so as to form a common surface with an upper surface of the main body (5a, 10a) of the adjacent post-processing device (5, 10), thus forming a recording material receiving section. Recording material discharged from the discharge outlet 95 is thus supported by the upper surface 6a and the upper surface of the post-processing device.

In addition, discharge of recording material to the exterior of the intermediate unit main body 6b through the discharge outlet 95 is used for switchback transport for introducing recording material into the double-sided transport unit 8 when the double-sided transport unit 8 is installed on the image recording device 1.

Further, in the intermediate unit 6, the transport rollers 92 provided in the transport channel 93, which introduce recording material with an image recorded thereon from the upstream to the downstream side with respect to the discharge direction, are capable of forward and reverse rotation, and also function to correct curl in recording material arising due to passage through heat-fixing rollers provided in the fixing unit 27 (see FIG. 2) of the image recording device 1.

Figure 17:
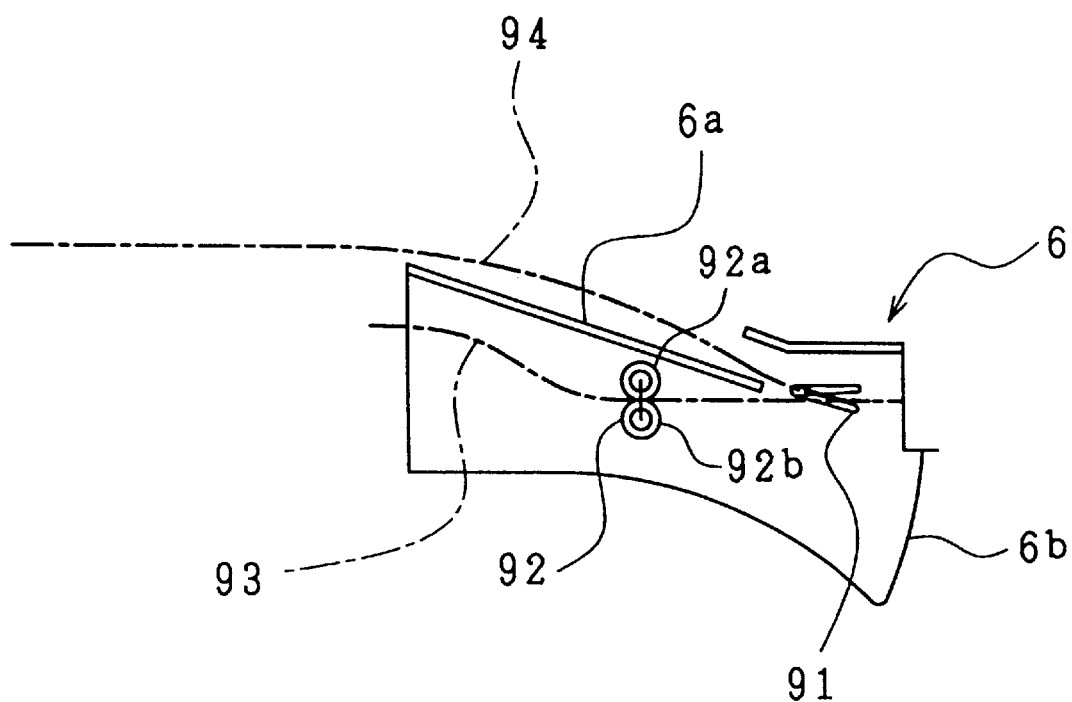
FIG. 17 is a magnified cross-sectional view showing part of the intermediate unit shown in FIG. 10 above.

Next, the curl correction function of the transport rollers 92 will be explained in detail with reference to FIG. 17. The pair of transport rollers 92 is made up of a first roller 92a, which is a hard roller located on the upper side of the transport channel 93, and a second roller 92b, which is a soft roller located on the lower side of the transport channel 93.

Further, in order to select whether or not to correct curl depending on the state of curl of the recording material arising due to passage through the heat fixing rollers of the image recording device 1, it is possible to use the switching gate 91 to select whether to use the transport channel 93 as a first switchback channel or to use the transport channel 94 as a second switchback channel. In this way, it is possible to select whether to perform switchback transport to send the recording material toward the double-sided transport unit 8 after correcting curl thereof, or without performing curl correction.

In other words, curl correction is performed on recording material transported toward the post-processing device provided downstream from the image recording device 1, but it is possible to select as desired, depending on circumstances, whether to perform curl correction on recording material which is temporarily introduced into the intermediate unit 6 and then switchback transported into the double-sided transport unit 8.

Further, although not shown in FIG. 10, it is also possible to provide a separation mechanism which, as needed, separates the first and second rollers 92a and 92b a distance apart from each other. By providing such a separation mechanism, it becomes possible to switch between pressing the first and second rollers 92a and 92b together or separating them apart, in accordance with whether curl correction is to be performed on recording material transported downstream from the transport rollers 92. Alternatively, equivalent effects can be obtained if, instead of separating the first and second rollers 92a and 92b, they are provided with a mechanism for varying the force with which they are pressed together.

Providing curl correction means in the intermediate unit 6 in this way resolves the problem of curl arising in recording material with developing agent heat-fixed thereon, and also has the advantage of making it possible to perform curl correction with certainty, as needed, on recording material transported toward the post-processing device, and on recording material transported toward the double-sided transport unit 8, using a single curl correction means.

Incidentally, the present embodiment uses a pair of rollers 92a and 92b as the transport rollers 92, but equivalent functions can be attained by using a combination of a belt and a roller.

The following will explain in detail the respective systems shown in FIGS. 1(c), 1(i), 1(d), 1(e), 1(f), and 1(h) with reference to FIGS. 11 through 16.

Figure 11:
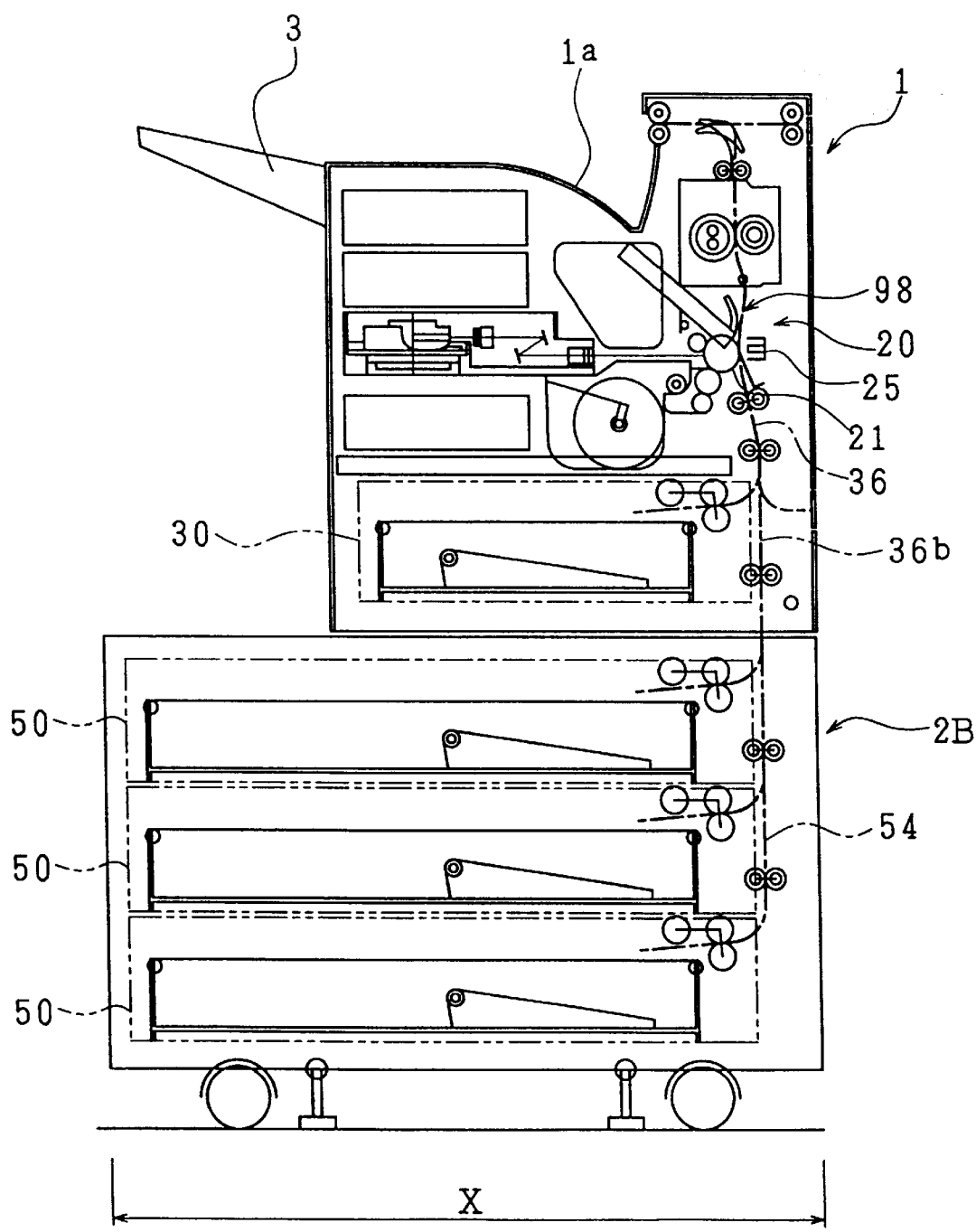
FIG. 11 is a cross-sectional view showing one system example of the image recording system according to the present invention.

FIG. 11 is a cross-sectional view showing the structure of the system shown in FIG. 1(c), in which the image recording device 1 is mounted on and supported by the paper supply unit 2B shown in FIG. 4(a).

As shown in FIG. 11, the transport channel 54 of the paper supply unit 2B and the transport channel 36b of the image recording device 1 have a positional relationship such that they meet when the image recording device 1 is mounted on the paper supply unit 2B. Thus recording material supplied from the paper supply unit 2B can be received into the transport channel 36 of the image recording device 1, and supplied to the electrophotographic process section 20.

In addition, in order to enable the discharge section 1a on the upper surface of the image recording device 1, which receives recording material with images recorded thereon, to receive recording material of large sizes, the discharge tray 3 is attached thereto so as to extend the discharge section 1a. In this way, large-sized recording material can be supported without falling from the upper surface of the image recording device 1.

The discharge tray 3 and the image recording device 1 are respectively provided with engaging members (not shown) which engage with one another, allowing the discharge tray 3 to be easily installed on the image recording device 1.

The foregoing system provides an environment which enables selective supply of a variety of recording material, and makes it possible to efficiently obtain recorded images by continuous supply of a desired recording material.

Further, as is evident from FIG. 11, the image recording device 1 mounted on and supported by the paper supply unit 2B, including the discharge tray 3 projecting from the image recording device 1 main body, fits within an installation width X of the paper supply unit 2B.

Consequently, a system which provides an environment enabling selective supply and image recording on a variety of recording material from small-sized to large-sized, and which is able to receive with certainty recording material discharged from the image recording device 1 with images recorded thereon, can be realized within an installation floor space small enough to enable installation of the system in nearby locations such as at the side of a desk. Accordingly, the user can easily check outputted images, thus contributing to great improvement in work efficiency.

Figure 12:
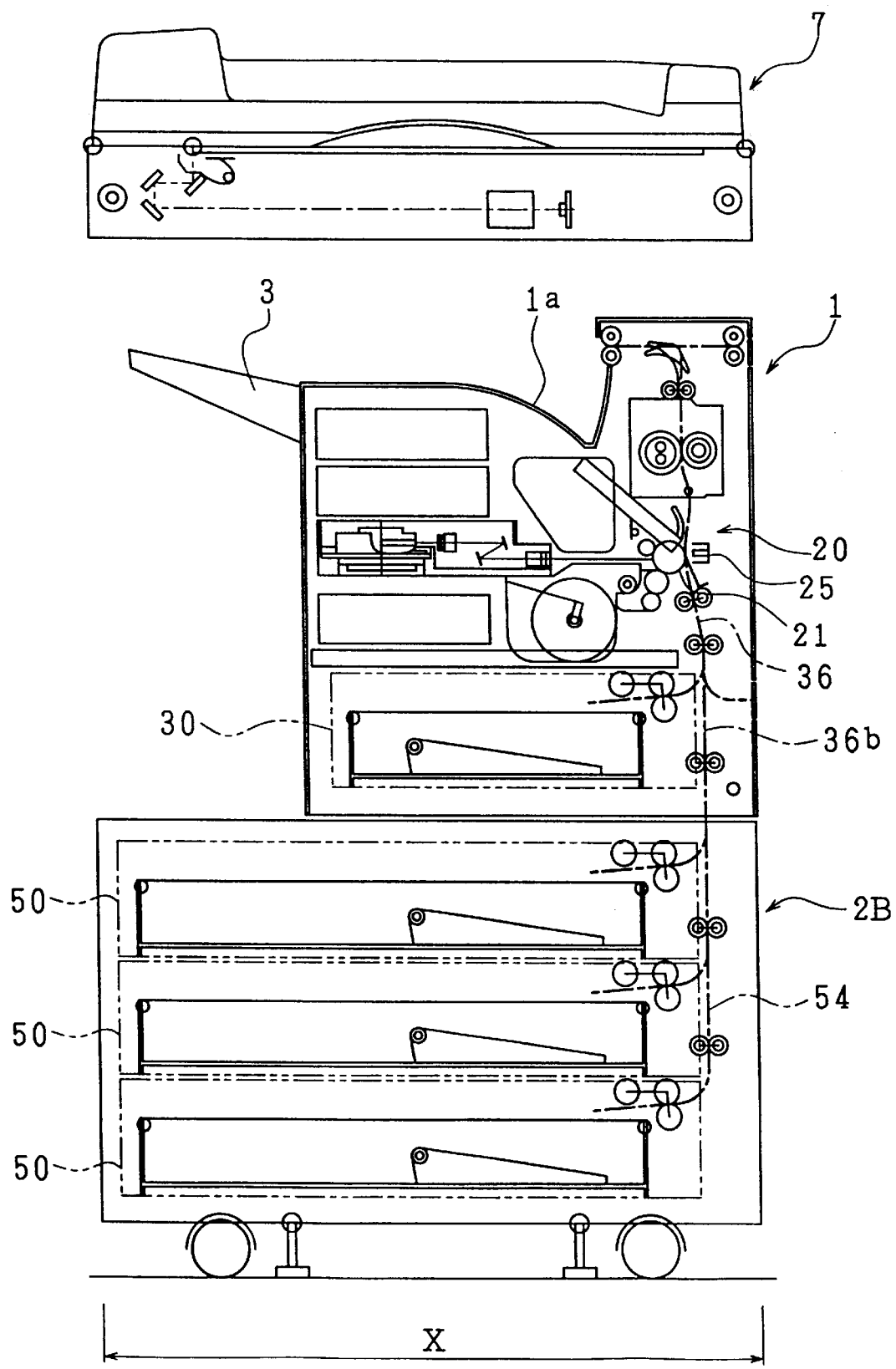
FIG. 12 is a cross-sectional view showing another system example of the image recording system according to the present invention.

Next, FIG. 12 is a cross-sectional view showing the structure of the system shown in FIG. 1(i), in which the original image reading device 7 is mounted above the image recording device 1 of the system shown in FIG. 11. The original image reading device 7 is mounted using the system rack 100 shown in FIG. 8.

In the system shown in FIG. 12, in addition to recording and recreating of images on recording material based on image data sent from an external device such as a personal computer, images based on image data of originals read by the original image reading device 7 can also be recreated and recorded on recording material, and the recording material with images recorded thereon can be discharged to the discharge section 1a on the upper surface of the image recording device 1.

Further, as is evident from FIG. 12, the original image reading device 7 has a shape which fits within an installation width X of the paper supply unit 2B, and causes no further increase in the width of the system.

Consequently, a system which provides an environment enabling selective supply and image recording on a variety of recording material from small-sized to large-sized, which is able to receive with certainty recording material discharged from the image recording device 1 with images recorded thereon, and which also functions as a copy machine, can be realized within an installation floor space small enough to enable installation of the system in nearby locations such as at the side of a desk. Accordingly, the user can easily check outputted images, and can also make copies there, thus contributing to further improvement in work efficiency.

Figure 13:
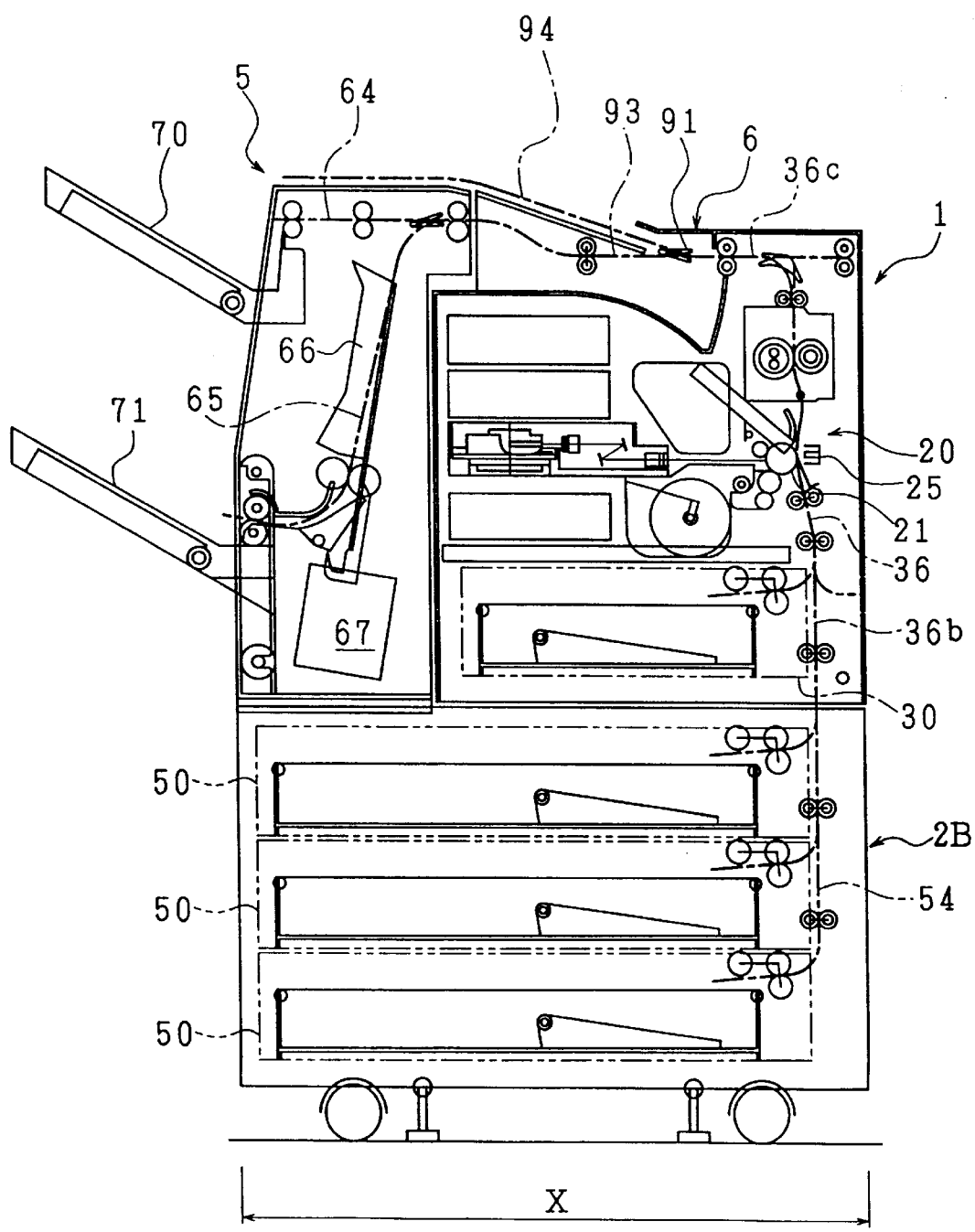
FIG. 13 is a cross-sectional view showing a further system example of the image recording system according to the present invention.

Next, FIG. 13 is a cross-sectional view showing the structure of the system shown in FIG. 1(d), in which the image recording device 1 and the stapling device 5 are mounted on and supported by the paper supply unit 2B shown in FIG. 4(a).

As shown in FIG. 13, in this system, as in that shown in FIG. 11, the transport channel 54 of the paper supply unit 2B and the transport channel 36b of the image recording device 1 have a positional relationship such that they meet when the image recording device 1 is mounted on the paper supply unit 2B.

Further, the transport channel 93 of the intermediate unit 6 and the transport channel 36c of the image recording device 1 have a positional relationship such that they meet when the intermediate unit 6 is mounted on the image recording device 1. Thus recording material discharged by the image recording device 1 can be sent into the intermediate unit 6.

Further, the transport channels of the stapling device 5 installed on the left side of the image recording device 1 and the transport channel 93 of the intermediate device 6 have a positional relationship such that they meet when the stapling device 5 is installed on the left side of the image recording device 1. Thus recording material discharged by the image recording device 1 can be sent into the stapling device 5 via the intermediate unit 6.

In the foregoing system, when recording material on which an image has been recorded is to be discharged without stapling, it is discharged into the upper discharge tray 70 through the transport channel 64 of the stapling device 5.

When recording material is to be stapled and discharged, on the other hand, recording material with images recorded thereon passes through the transport channel 65 provided with the processing tray 66, and is stapled in the stapling processing section 67 and discharged into the lower discharge tray 71.

Further, by control of switching of the switching gate 91, recording material can also be discharged through the transport channel 94 onto the upper surface of the intermediate unit 6 and the upper surface of the stapling device 5. It is effective to use the transport channel 94 when, for example, the user wishes to distinguish recording material recording an image accepted through interrupt printing, etc. from other recording material. Since recording material discharged through the transport channel 94 is discharged to the uppermost surface of the system, this recording material will not be mistaken for other recording material, and will be easily removable.

The foregoing system provides an environment which enables selective supply of a variety of recording material, makes it possible to efficiently obtain recorded images by continuous supply of a desired recording material, and enables stapling to be performed, as desired, on recording material with images recorded thereon.

Further, as is evident from FIG. 13, the image recording device 1 and the main body (chief part) of the stapling device, both mounted on and supported by the paper supply unit 2B, fit within an installation width X of the paper supply unit 2B.

Consequently, a system which provides an environment enabling selective supply and image recording on a variety of recording material from small-sized to large-sized, and which is able to staple, as necessary, and receive with certainty recording material discharged from the image recording device 1 with images recorded thereon, can be realized within an installation floor space small enough to enable installation of the system in nearby locations such as at the side of a desk. Accordingly, the user can easily check outputted images, and can perform stapling as necessary, thus contributing to further improvement in work efficiency.

Figure 14:
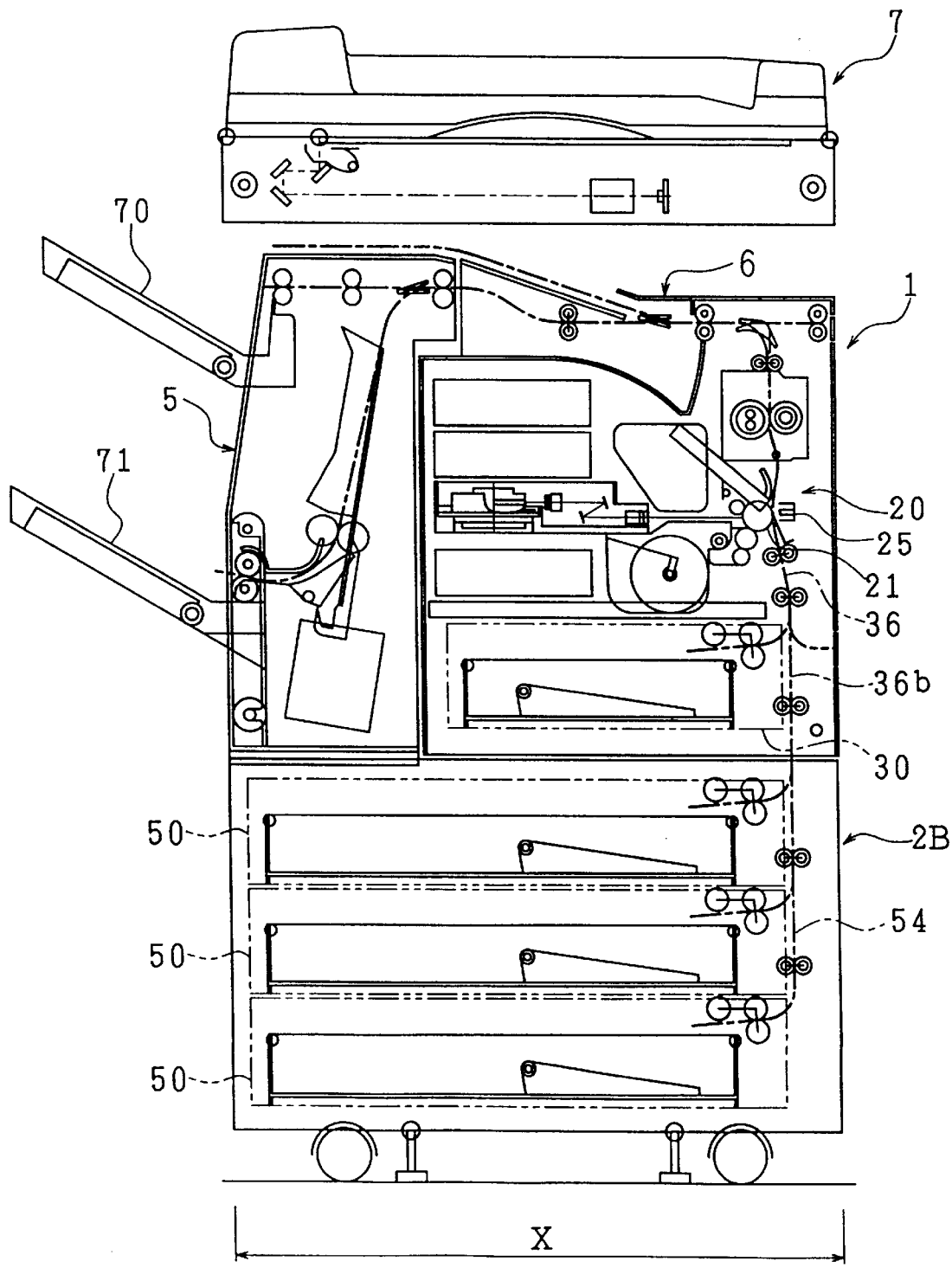
FIG. 14 is a cross-sectional view showing a further system example of the image recording system according to the present invention.

Next, FIG. 14 is a cross-sectional view showing the structure of the system shown in FIG. 1(e), in which the original image reading device 7 is mounted above the system shown in FIG. 13. The original image reading device 7 is mounted using the system rack 100 shown in FIG. 8.

In the system shown in FIG. 14, in addition to recording and recreating of images on recording material based on image data sent from an external device such as a personal computer, images based on image data of originals read by the original image reading device 7 can also be recreated and recorded on recording material, and the recording material with images recorded thereon can be stapled as necessary, and discharged to one of the discharge trays 70 and 71. Further, recording material can also be discharged to extend over the upper surface of the intermediate unit 6 and the upper surface of the stapling device 5.

Further, as is evident from FIG. 14, the original image reading device 7 has a shape which fits within an installation width X of the paper supply unit 2B, and causes no further increase in the width of the system.

Consequently, a system which provides an environment enabling selective supply and image recording on a variety of recording material from small-sized to large-sized, which is able to perform stapling as necessary and receive with certainty recording material discharged from the image recording device 1 with images recorded thereon, and which also functions as a copy machine, can be realized within an installation floor space small enough to enable installation of the system in nearby locations such as at the side of a desk. Accordingly, the user can easily check outputted images, and can also perform stapling as necessary and make copies there, thus contributing to further improvement in work efficiency.

Figure 15:
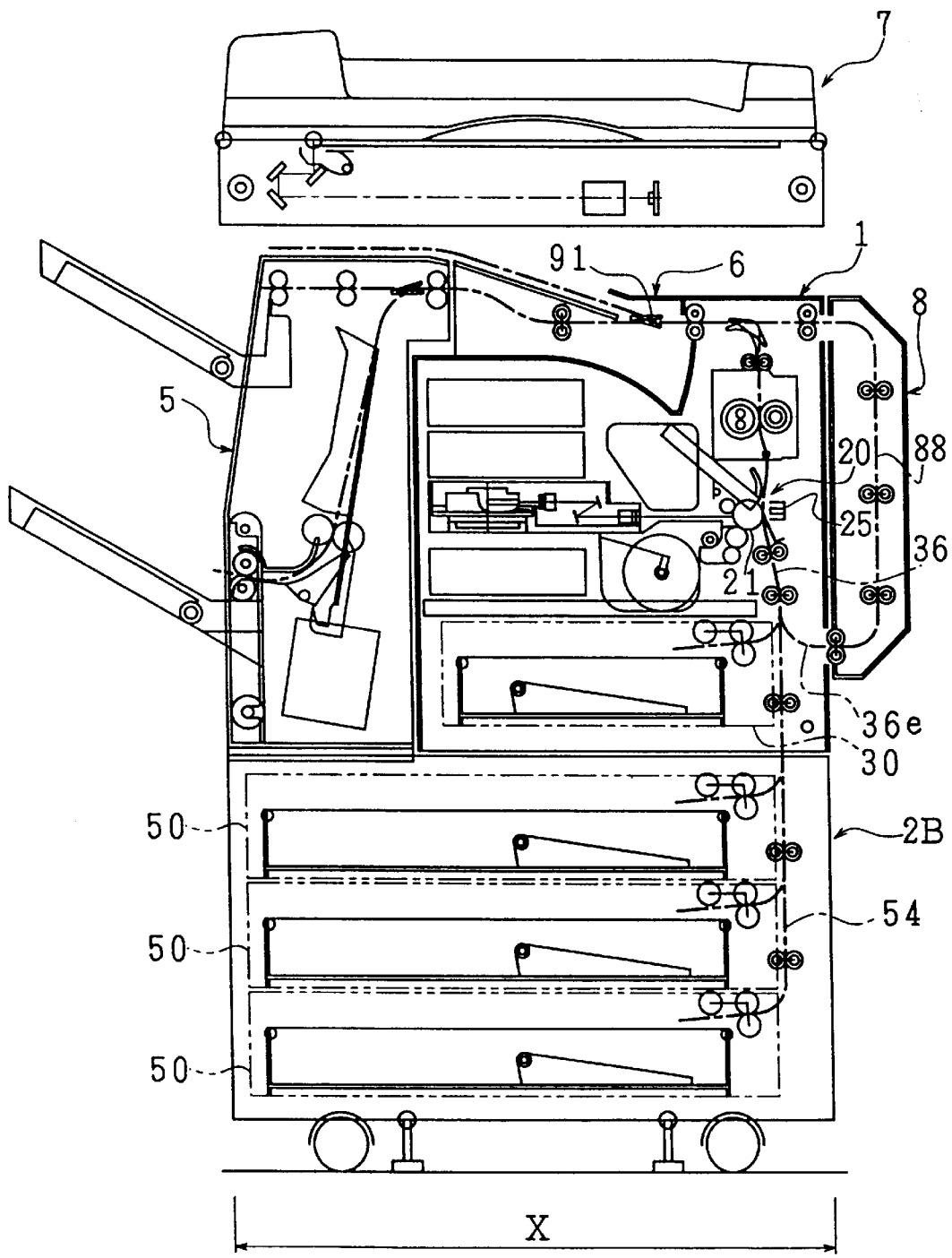
FIG. 15 is a cross-sectional view showing a further system example of the image recording system according to the present invention.

Next, FIG. 15 is a cross-sectional view showing the structure of the system shown in FIG. 1(f), in which the double-sided transport unit 8 is mounted on the side of the image recording device 1 of the system shown in FIG. 14.

In this structure, the transport channel 88 of the double-sided transport unit 8 and the transport channel 36e of the image recording device 1 have a positional relationship such that they meet when the double-sided transport unit 8 is installed on the side of the image recording device 1, so that recording material on a first side of which the image recording device 1 has recorded an image, after being turned over, is transported back toward the space between the photosensitive drum 21 and the transfer unit 25 of the image recording device 1, where an image is recorded on the second side of the recording material.

The discharge rollers 38 provided before the intermediate unit 6 in the transport channel extending from the image recording device 1 to the intermediate unit 6 are capable of forward and reverse rotation.

Further, by switching the rotation of the discharge rollers 38 from forward to reverse, a switchback, for sending recording material temporarily introduced into the intermediate unit 6 into the double-sided transport unit 8, can be realized. Accordingly, the discharge rollers 38 also function as switchback transport means. Here, recording material with a n image recorded thereon, discharged from the discharge section 1a of the image recording device 1, is temporarily guided by the switching gate 91 of the intermediate unit 6 to the upper surface of the intermediate unit 6 main body, and toward the upper surface of the stapling device 5. Here, recording material of small size (in the direction of transport of the recording material) is guided and supported by the upper surface of the intermediate unit 6, and recording material of large size (in the direction of transport of the recording material) is guided and supported by the upper surfaces of the intermediate unit 6 and the stapling device 5.

Consequently, an environment can be provided which enables selective supply and image recording on a variety of recording material from small-sized to large-sized, and it is possible to efficiently obtain recorded images by continuous supply of a desired recording material. Further, post-processing such as stapling can be performed as necessary on recording material on which images have been recorded. In addition, recording material can be sent through a switchback and guided into the double-sided transport unit 8 within the installation space of the image recording system, without the use of a special device, thus enabling recording of images on both sides of the recording material. Moreover, the system also functions as a copy machine.

Accordingly, the user can easily check outputted images, and can also perform stapling as necessary and even make double-sided copies there, thus contributing to further improvement in work efficiency.

Incidentally, FIGS. 11 through 15 show structures provided with the paper supply unit 2B shown in FIG. 4(a), but the paper supply unit 2B shown in FIG. 4(b) may also be used. Further, structures including the paper supply unit 2A shown in FIG. 3 may also be used.

Further, the foregoing explained installation of the double-sided transport unit 8 on the system shown in FIG. 14, but the double-sided transport unit 8 may of course also be installed on the systems shown in FIGS. 11, 12, and 13, and on the image recording device 1 alone, thus making it possible to record images on both sides of recording material in each of these systems. Incidentally, in structures where the intermediate unit 6 is not installed in the discharge section 1a of the image recording device 1, recording material with an image recorded on the first side temporarily discharged from the image recording device 1 is guided and supported by the discharge section 1 on the upper surface of the image recording device 1, and then guided toward the double-sided transport unit 8.

Further, the foregoing explained a system including the stapling device 5 provided with various levels (installation conditions) of peripheral devices, but another possibility is a system in which the sorter 10 shown in FIG. 6 replaces the stapling device 5 as recording material post-processing device. By providing the sorter 10, it is possible to automatically perform sorting and collating instead of stapling.

Figure 16:
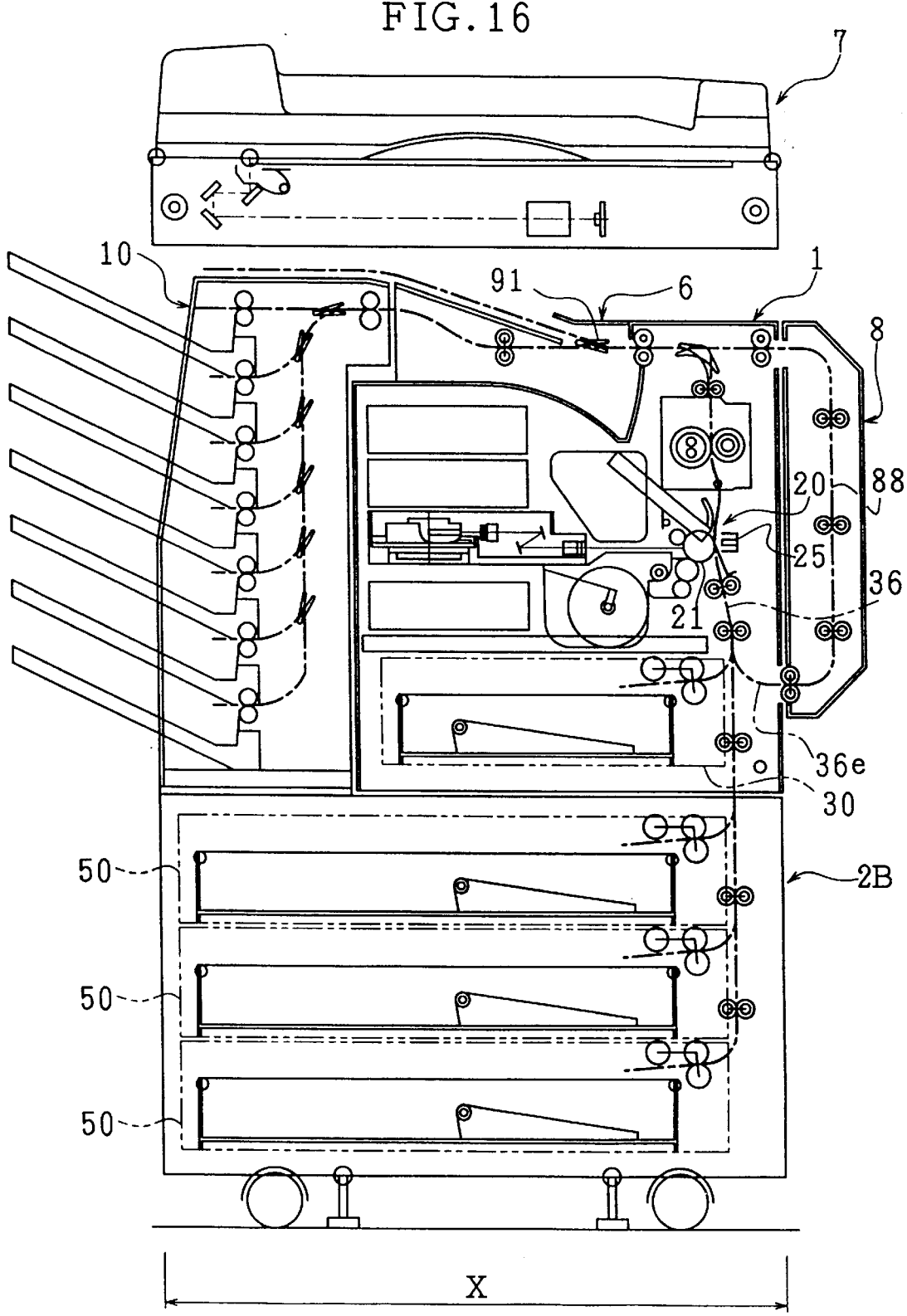
FIG. 16 is a cross-sectional view showing a further system example of the image recording system according to the present invention.

FIG. 16 shows an example of the system including the sorter 10 provided with the full complement of peripheral devices. With this structure, an environment can be provided which enables selective supply and image recording on a variety of recording material from small-sized to large-sized, and it is possible to efficiently obtain recorded images by continuous supply of a desired recording material. Further, sorting and collating of recording material on which images have been recorded can be automatically performed as necessary. In addition, recording material can be sent through a switchback and guided into the double-sided transport unit 8 within the installation space of the image recording system, without the use of a special device, thus enabling recording of images on both sides of the recording material. Moreover, the system also functions as a copy machine.

Accordingly, the user can easily check outputted images, and can also perform sorting as necessary and even make double-sided copies there, thus contributing to further improvement in work efficiency.

Figure 18:
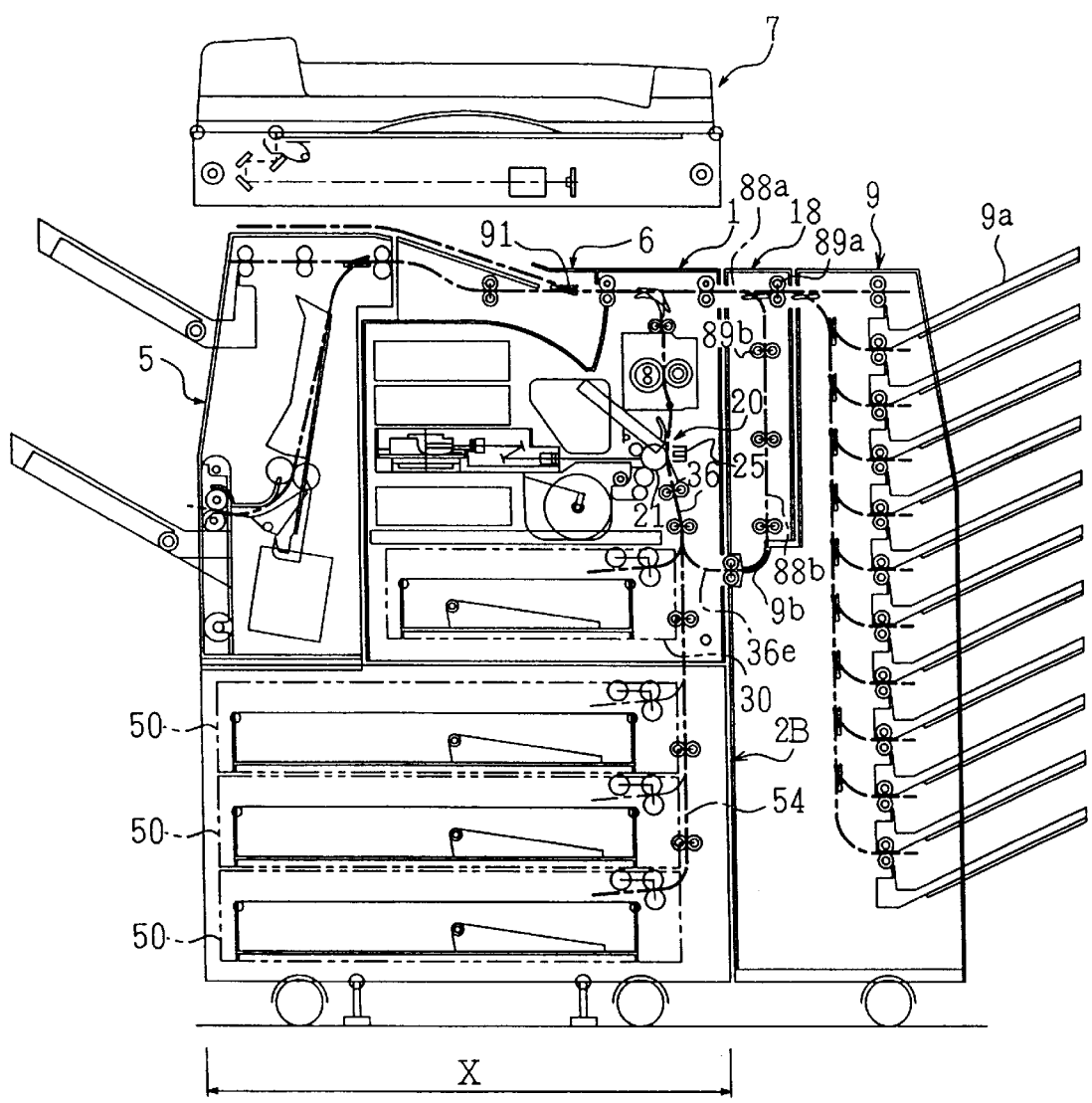
FIG. 18 is a cross-sectional view showing a further system example of the image recording system according to the present invention.

Next, FIG. 18 is a cross-sectional view showing the structure of an image recording system equivalent to the system shown in FIG. 14, further provided with a double-sided transport unit 18 differing somewhat in structure from the double-sided transport unit 8 used in the system shown in FIG. 15, mounted on the side of the image recording device 1, and with a mail bin sorter 9 (laterally located recording material post-processing device) provided on the side of the system as a whole so as to cover the side of the double-sided transport device 18 not facing the image recording device 1.

The double-sided transport unit 18 is provided with a transport channel 88a which guides switchback-transported recording material to the mail bin sorter 9, and with a transport channel 88b which guides the recording material into the interior of the double-sided transport unit 18. Along the transport channel 88a is provided a single pair of transport rollers 89a, and along the transport channel 88b is provided three pairs of transport rollers 89b.

The mail bin sorter 9 receives recording material with an image recorded there on from the image recording device 1, and discharges the received recording material to and stores it in a predetermined bin 9a. In the mail bin sorter 9, members thereof such as a control circuit for managing its operation, a power source unit for driving, etc. are provided in the part of the mail bin sorter 9 below the double-sided transport device 18. In this way, although more space is required than the installation width X of the paper supply unit 2B, the increase in installation space of the system as a whole due to provision of the mail bin sorter 9 can be held to a minimum.

Figure 19:
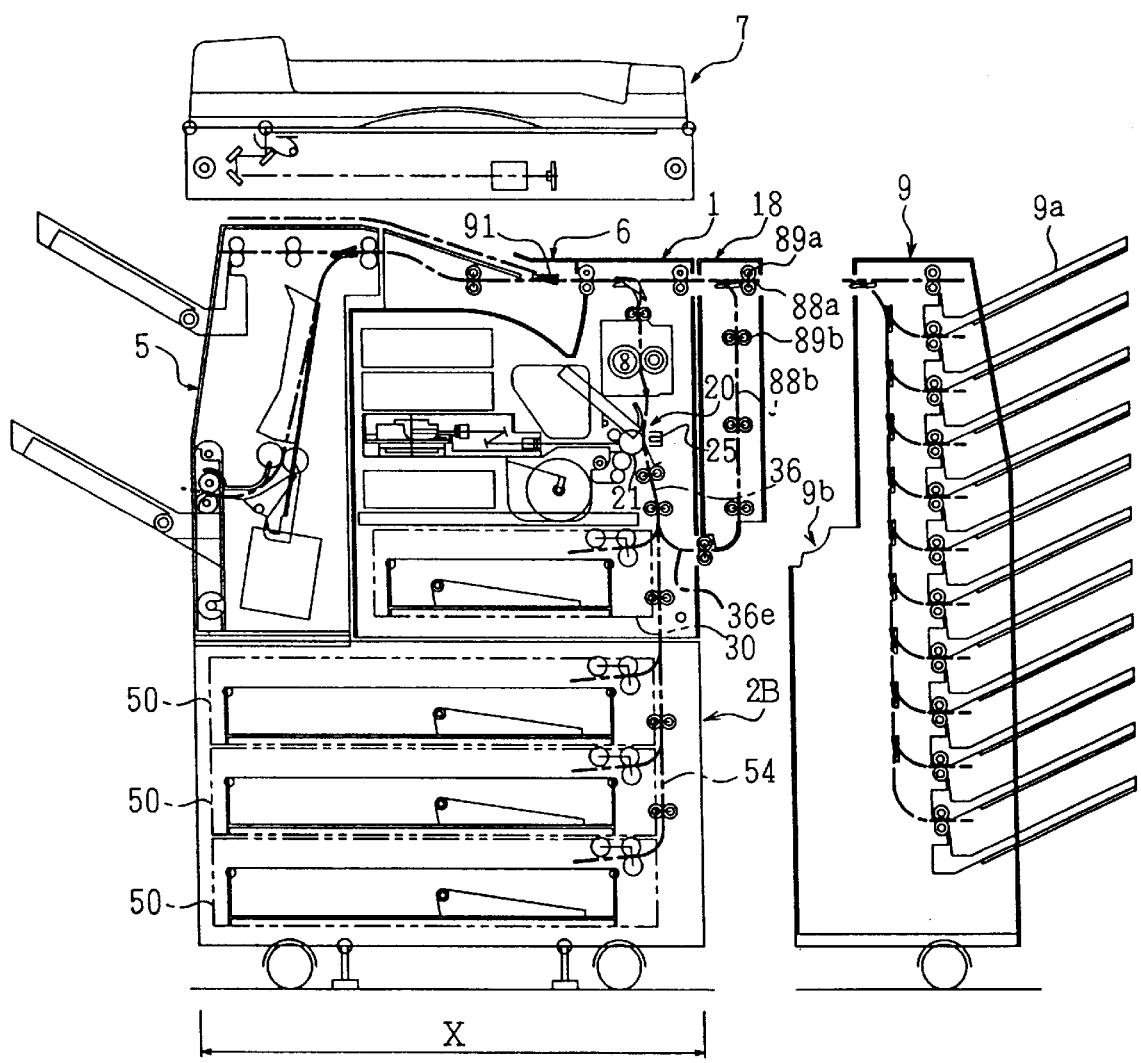
FIG. 19 is a cross-sectional view showing separation of a mail bin sorter from a main body of the image recording system shown in FIG. 18.

Further, part of the mail bin sorter 9 forms part of the transport channel 88b in the lower part of the double-sided transport unit 18. Here, since the mail bin sorter 9 forms at least part of the transport channel 88b of the double-sided transport unit 18, when the mail bin sorter 9 is separated a distance from the side of the image recording system (i.e. the side of the double-sided transport unit 8), as shown in FIG. 19, part of the transport channel 88b of the double-sided transport unit 18 can be opened. Accordingly, recording material stuck in the transport channel 88b can be easily removed.

In addition, the surface of the mail bin sorter 9 facing the image recording device 1 has a concave portion 9b which corresponds to the shape of the double-sided transport unit 18, and is positioned by engagement of the concave portion 9b with the double-sided transport unit 18.

Although the structure of the double-sided transport unit differs somewhat, the image recording system shown in FIG. 18 can basically be deemed equivalent to the system shown in FIG. 15, upgraded by provision of the mail bin sorter 9. Accordingly, the transport channel for guiding recording material discharged from the discharge section of the image recording device 1 into the double-sided transport device 18, and the effects obtainable by provision of this transport channel, are equivalent to those of the system shown in FIG.

15. A further effect of the image recording system shown in FIG. 18 is that, by providing the mail bin sorter 9, electronic mail from network-linked devices, document data from personal computers, etc. can be recorded on recording material, which can be classified (sorted).

Figure 20:
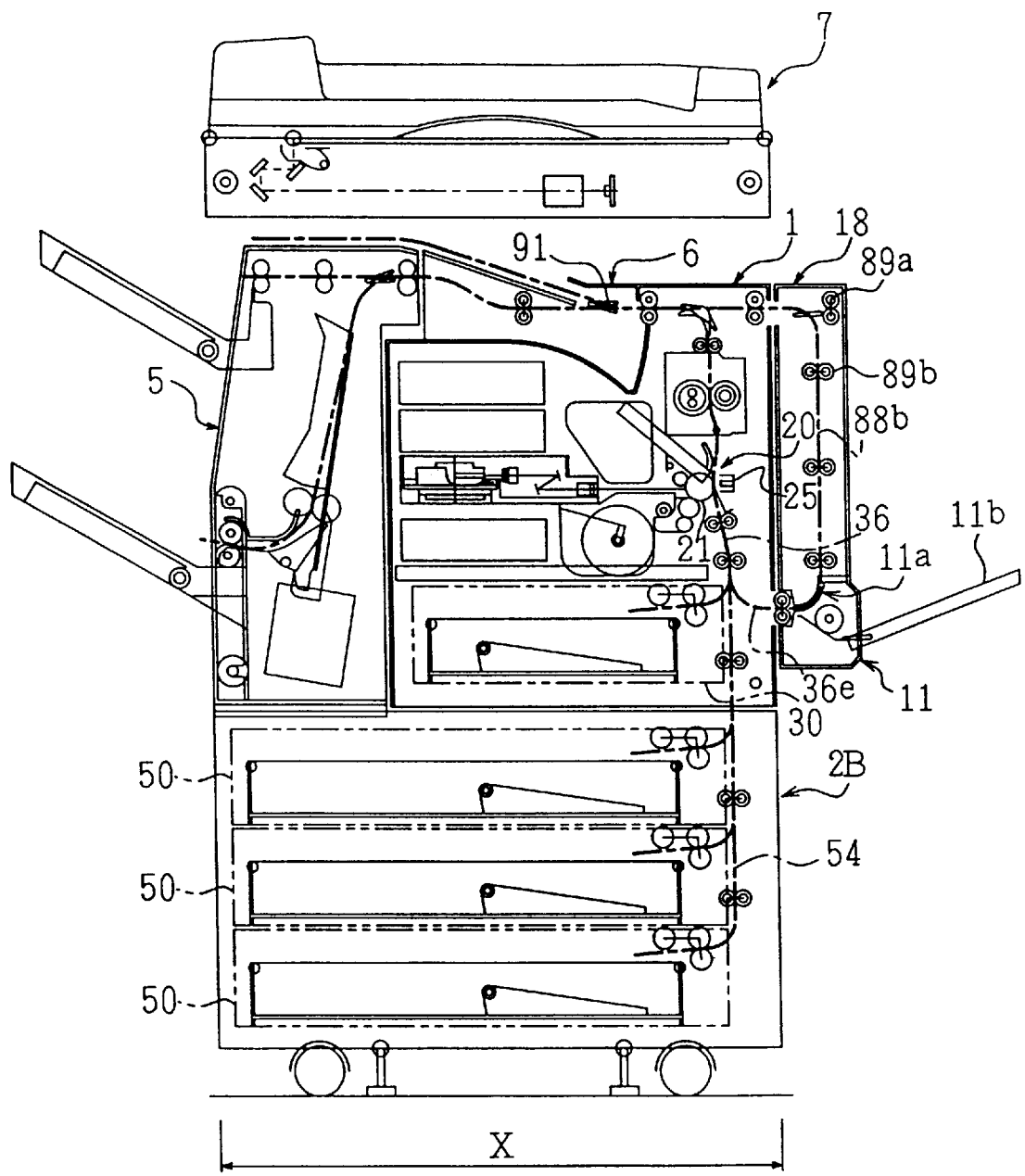
FIG. 20 is a cross-sectional view showing a further system example of the image recording system according to the present invention.

When, as shown in FIG. 20, the mail bin sorter 9 is replaced by a multi hand-feed unit 11 (double-sided transport device recording material supply device) as an additional system peripheral device, an installation section 11a, for installation of the multi hand-feed unit 11 on the double-sided transport unit 18, has a shape conforming to that part of the transport channel 88b in the lower part of the double-sided transport unit 18. By this means, even if the multi hand-feed unit 11 is provided in place of the mail bin sorter 9, the transport channel 88b of the double-sided transport unit 18 can be provided with certainty, and installation space can be held to a minimum. Incidentally, a hand-feed tray 11b (recording material support section) of the multi hand-feed unit 11 can be folded into the right side of the double-sided transport unit 18, thus enabling the installation space occupied by the hand-feed tray 11b to be further suppressed when it is not in use.

Figure 21:
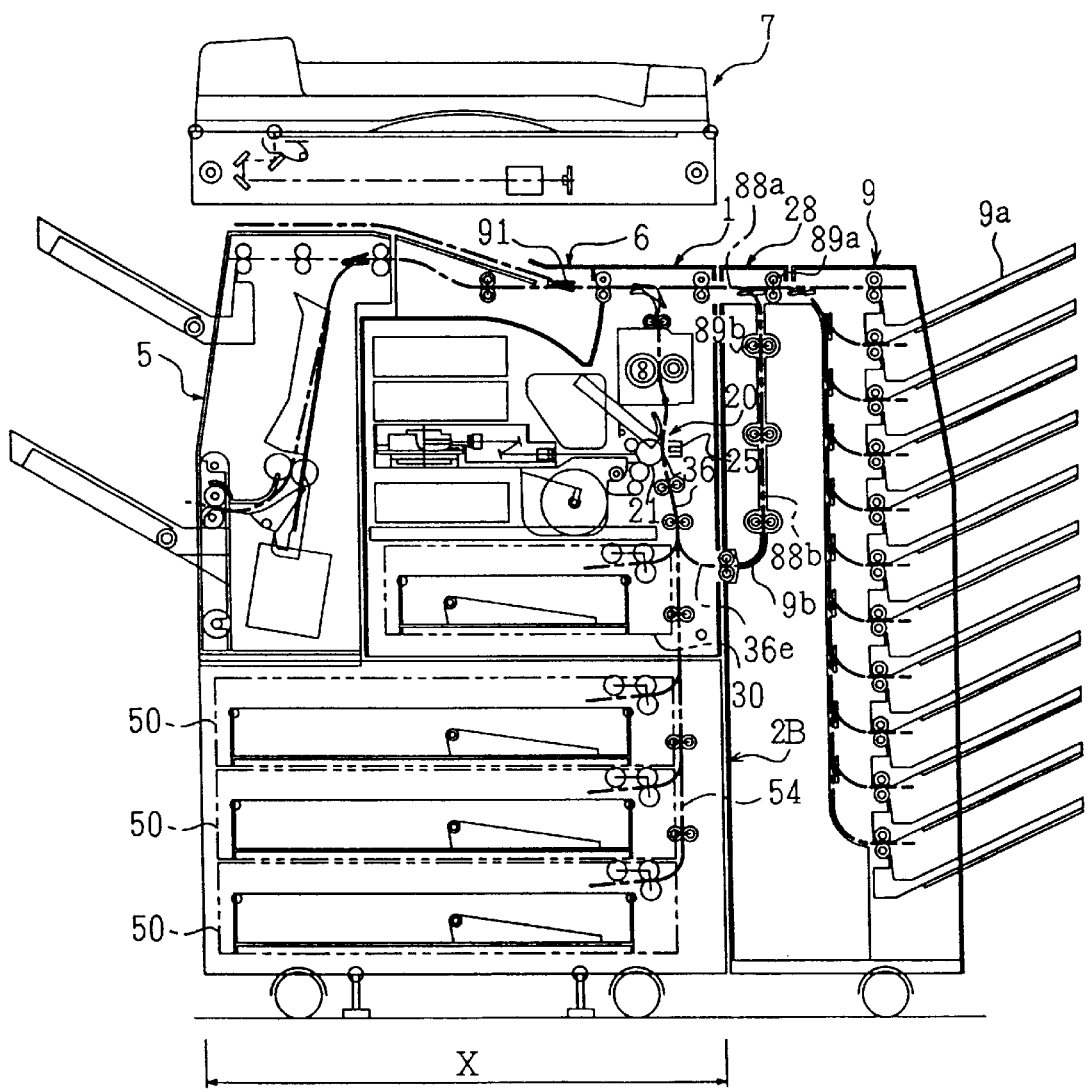
FIG. 21 is a cross-sectional view showing a further system example of the image recording system according to the present invention.
Figure 22:
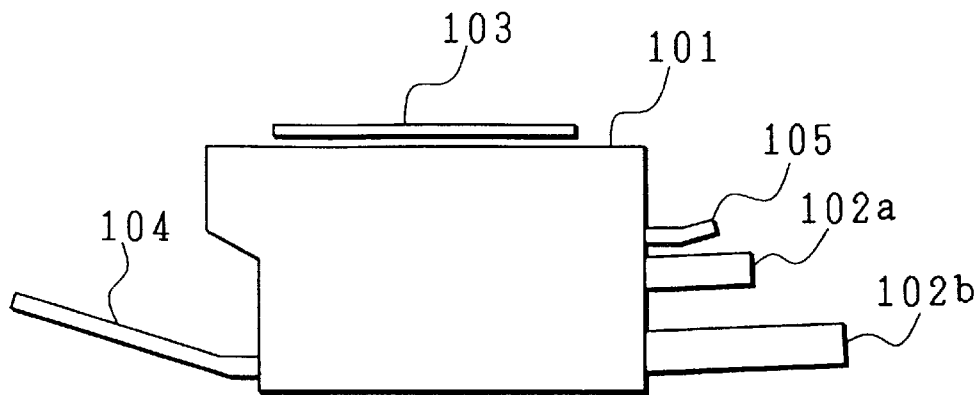
FIGS. 22(a) and 22(b) are cross-sectional views showing a conventional image recording system.
Figure 22:
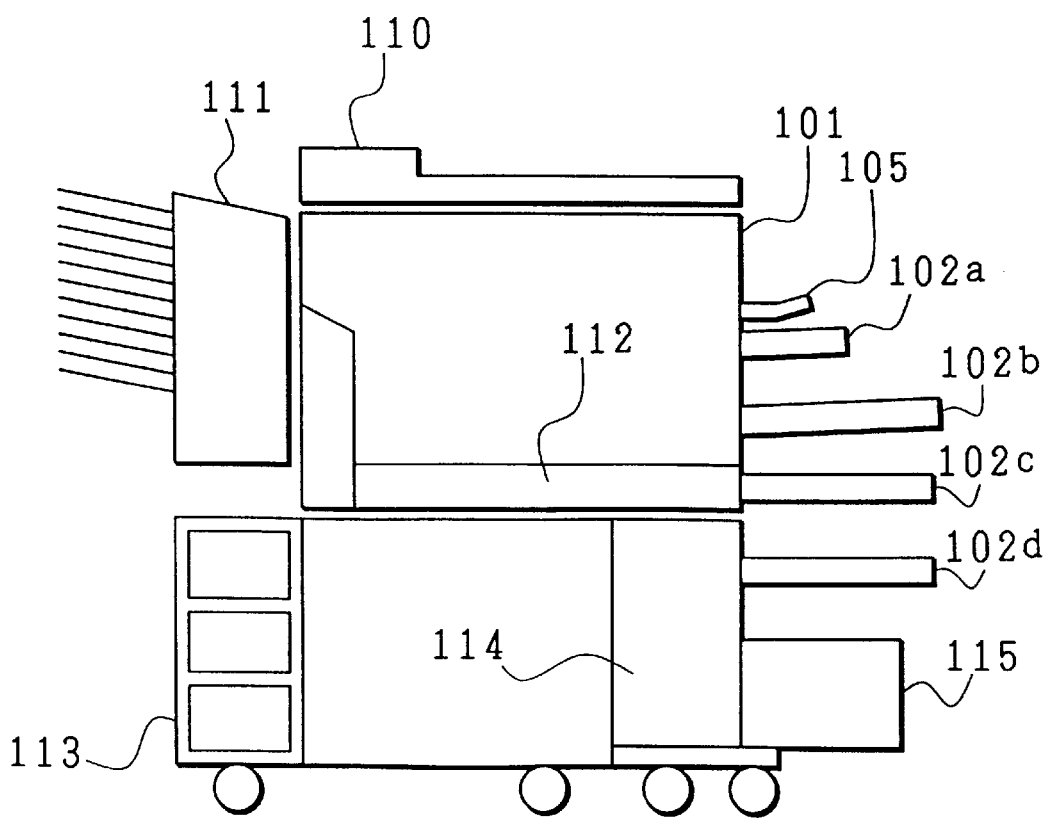

Incidentally, in the image recording system shown in FIG. 18, part of the mail bin sorter 9 forms part of the transport channel 88b in the lower part of the double-sided transport unit 18, but part of the mail bin sorter 9 may, as in the image recording system shown in FIG. 21, form substantially all of the transport channel 88b of the double-sided transport unit 18. Equivalent effects can be obtained in this case as well.

Further, although FIGS. 18 through 21 show structures provided with the paper supply unit 2B shown in FIG. 4(a), it is also possible to use structures provided with the paper supply unit 2B shown in FIG. 4(b). Again, a structure provided with the paper supply unit 2A shown in FIG. 3 is also possible. As discussed above, an image recording system according to the present invention is made up of an image recording device (1) which records images on small-sized recording material and large-sized recording material larger than the small-sized recording material, and one or more peripheral devices (2A, 2B, 5, 7, 8, 9, 10, 11, 18, 28) selectively connected to the image recording device (1) according to functions the image recording system is desired to perform; the image recording device (1) internally incorporating a recording material supply section (30) containing the small-sized recording material, and the peripheral devices (2A, 2B, 5, 7, 8, 9, 10, 11, 18, 28) including a recording material supply device (2A, 2B) which contains and supplies to the image recording device (1) the large-sized recording material, which has a width which is in keeping with measurements of the large-sized recording material; in which the image recording device (1) is structured so that small-sized and large-sized recording material with an image recorded thereon is discharged onto an upper surface (1a) of the image recording device (1), and has a width which is in keeping with measurements of the small-sized recording material, and is installed within the extent (X) of an upper surface of the recording material supply device (2A, 2B)

Consequently, the width for installation of the image recording system can be held to the minimum necessary, and even if the system is upgraded, the installation width thereof can be substantially held to within the width of the recording material supply device (2A, 2B) Thus, in the office, the image recording system can be installed nearby, such as at the side of a desk, and outputted images can be viewed easily, thus contributing to improvement of work efficiency.

Further, it is preferable if an image recording system according to the present invention is structured as above, in which the peripheral devices (2A, 2E, 5, 7, 8, 9, 10, 11, 18, 28) include one or more additional peripheral devices (5, 7, 8, 9 10, 11, 18, 28) in addition t o the recording material supply device (2A, 2B), and at least one of the additional peripheral devices (5, 7, 8, 9, 10, 11, 18, 28) is installed so that the dimensions in a horizontal plane of at least part of the additional peripheral device do not extend beyond the dimensions of the upper surface of the recording material supply device (2A, 2B).

Further, as discussed above, it is preferable if an image recording system according to the present invention is structured as above, in which the peripheral devices (2A, 2B, 5, 7, 8, 9, 10, 11, 18, 28) include one or more additional peripheral devices (5, 7, 8, 9 10, 11, 18, 28) in addition to the recording material supply device (2A, 2B), and at least one of the additional peripheral devices (5, 7, 8, 9, 10, 11, 18, 28) is installed so as to fit within the extent (X) of the upper surface of the recording material supply device (2A, 2B).

Further, it is preferable if an image recording system according to the present invention is structured as above, in which the image recording device (1) is installed on part of the upper surface of the recording material supply device (2A, 2B), the peripheral devices (2A, 2B, 5, 7, 8, 9, 10, 11, 18, 28) include one or more additional peripheral devices (5, 7, 8, 9, 10, 11, 18, 28) in addition to the recording material supply device (2A, 2B), and at least one of the additional peripheral devices (5, 7, 8, 9, 10, 11, 18, 28) is installed on a remaining part of the upper surface of the recording material supply device (2A, 2B).

Further, as discussed above, it is preferable if an image recording system according to the present invention is structured as above, in which the peripheral devices (2A, 2B, 5, 7, 8, 9, 10, 11, 18, 28) include one or more additional peripheral devices (5, 7, 8, 9 10, 11, 18, 28) in addition to the recording material supply device (2A, 2B), and all of the additional peripheral devices (5, 7, 8, 9, 10, 11, 18, 28) are installed so as to fit within the extent (X) of the upper surface of the recording material supply device (2A, 2B).

Again, an image recording system according to the present invention may be structured as above, further provided with a discharge tray (3); in which the image recording device (1) is mounted on top of the recording material supply device (2A, 2B), and the discharge tray (3) is attached to the image recording device (1) on a downstream side thereof with respect to a paper discharge direction, extending out from the upper surface (1a) of the image recording device (1), but within the extent (X) of the upper surface of the recording material supply device (2A, 2B).

By providing the recording material supply device (2A, 2B), it becomes possible to perform image recording using large-sized recording material larger than the recording material supplied by the recording material supply section (30) incorporated within the image recording device (1).

Further, since the size of the image recording device (1) is substantially determined by the size of the small-sized recording material contained in the recording material supply section (30) incorporated within the image recording device (1), the upper surface (1a) of the image recording device (1) also has a size in keeping with the size of the small-sized recording material. Consequently, if the user attempts to support a piece of large-sized recording material supplied from the recording material supply device (2A, 2B) on the upper surface (1a) of the image recording device (1) alone, the recording material may fall from the discharge section (1a), but since the present structure provides the discharge tray (3), a piece of large-sized recording material can be held without falling from the discharge section (1a). Moreover, since the discharge tray (3) is of a size which fits within the extent (X) of the upper surface of the recording material supply device (2A, 2B), provision of the discharge tray (3) does not increase the installation width of the system.

Accordingly, an image recording system which is able to perform image recording using large-sized recording material larger than the recording material supplied by the recording material supply section (30) incorporated within the image recording device (1), and having no problems with stacking of recording material, can be provided with a size (installation width) small enough to enable installation of the system in nearby locations such as at the side of a desk.

Further, an image recording system according to the present invention can be structured as above, in which the image recording device (1) is mounted on top of the recording material supply device (2A, 2B), and the peripheral devices (5, 7, 8, 9, 10, 11, 18, 28) include a recording material post-processing device (5, 10), which receives the small-sized and large-sized recording material outputted by the image recording device (1) with an image recorded thereon, performs predetermined post-processing on the small-sized and large-sized recording material received, and discharges the small-sized and large-sized recording material post-processed; and the recording material post-processing device (5, 10) is mounted on top of the recording material supply device (2A, 2B) adjacent to the image recording device (1), on a downstream side thereof with respect to a paper discharge direction.

With this structure, by providing the recording material supply device (2A, 2B), it becomes possible to perform image recording using large-sized recording material larger than the recording material supplied by the recording material supply section (30) incorporated within the image recording device (1); and by providing the recording material post-processing device (5, 10), post-processing such as stapling and sorting can be performed on recording material with an image recorded thereon. Moreover, since the recording material post-processing device (5, 10) fits within the extent of the upper surface of the recording material supply device (2A, 2B), provision of the recording material post-processing device (5, 10) does not increase the installation area of the system.

Accordingly, an image recording system which is able to perform image recording using large-sized recording material larger than the recording material supplied by the recording material supply section (30) incorporated within the image recording device (1), and able to perform post-processing such as sorting and stapling, can be provided with a size (installation width) small enough to enable installation of the system in nearby locations such as at the side of a desk.

Further, an image recording system according to the present invention can be structured as described above, in which an intermediate unit (6), which is an intermediary in transport of small-sized and large-sized recording material with an image recorded thereon toward the recording material post-processing device (5, 10), is installed on an upper surface of the image recording device (1); the intermediate unit (6) having a first transport channel (93) which transports small-sized and large-sized recording material with an image recorded thereon toward the recording material post-processing device (5, 10), and a second transport channel (94) which transports small-sized and large-sized recording material with an image recorded thereon toward a recording material receiving section (6a) comprising at least in part an upper surface of the recording material post-processing device main body (5a, 1a).

With this structure, by means of the intermediate unit (6), recording material with an image recorded thereon can not only be guided into the recording material post-processing device (5, 10), but can also be transported to a recording material receiving section (6a) comprising at least in part an upper surface of the recording material post-processing device main body (5a, 10a). Thus, when it is not necessary to transport recording material with an image recorded thereon to the recording material post-processing device (5, 10), it can be discharged to and supported by the upper surface of the recording material post-processing device main body (5a, 10a), i.e., by the uppermost surface of the system.

Accordingly, discharged recording material is easier for the user to pick up than when it is discharged into a discharge tray (70 and 71; 77) of the recording material post-processing device (5, 10), and, in cases of interrupt printing, for example, recording material can be discharged to the recording material receiving section (6a) and thus clearly distinguished from recording material discharged to the discharge tray (70 and 71; 77) of the post-processing device (5, 10), thus making it much easier to separate the respective discharged recording material thereafter. As a result, in addition to the effects obtainable when the discharge tray (3) is attached to the image recording device (1) extending out from the upper surface (1a) of the image recording device (1), but within the extent (X) of the upper surface of the recording material supply device (2A, 2B), the foregoing structure can further improve ease of use and convenience.

Further, an image recording system according to the present invention can be structured as above, in which the peripheral devices (2A, 2B, 5, 7, 8, 9, 10, 11) include a double-sided transport device (8, 18, 28) which transports small-sized and large-sized recording material vertically downward, provided on a side of the image recording device (1) opposite a side adjacent to the recording material post-processing device (5, 10); and switchback transport for introducing small-sized and large-sized recording material into the double-sided transport device (8, 18, 28), is performed by using the second transport channel (94) of the intermediate unit (6) to temporarily guide small-sized and large-sized recording material with an image recorded on one side into the recording material receiving section (6a).

With this structure, by providing the double-sided transport device (8, 18, 28), it i s possible to record images on both sides of the recording material. However, in a structure like that described above, in which the image recording device (1) and the recording material post-processing device (5, 10) fit within the extent (X) of the upper surface of the recording material supply device (2A, 2B), the transport channel from the image recording device (1) to the recording material post-processing device (5, 10) is very short. If, in order to guide the recording material into the double-sided transport device (8, 18, 28), switchback transport is performed using this short transport channel, the front end of the recording material advances into a transport channel of the recording material post-processing device (5, 10) having complex mechanisms for stapling and sorting processing, making paper jams more likely, and complicating control.

For this reason, by means of a structure like the foregoing, in which switchback transport for introducing the recording material into the double-sided transport device (8, 18, 28) is performed by using the second transport channel (94) of the intermediate unit (6) to temporarily guide recording material with an image recorded on one side into the recording material receiving section (6a), the front end of the recording material is not introduced into the transport channel of the recording material post-processing device (5, 10) having complex mechanisms. Thus paper jams are less likely, and complicated control is unnecessary.

Consequently, an image recording system which is able to perform image recording using large-sized recording material larger than the recording material supplied by the recording material supply section (30) incorporated within the image recording device (1), and able to perform post-processing such as sorting and stapling, and is further able to perform double-sided image recording without requiring complicated control or giving rise to a high paper jam rate, can be provided with a size (installation width) small enough to enable installation of the system in nearby locations such as at the side of a desk.

Incidentally, it is preferable if the foregoing structure is provided with switchback transport means (38) which, after temporarily guiding recording material with an image recorded on one side into the recording material receiving section (6a), perform switchback transport to introduce the recording material into the double-sided transport unit (8, 18, 28).

Further, it is preferable if the image recording system according to the present invention is structured as described above, in which the recording material supply device (2A, 2B) is structured of a parallel arrangement of recording material supply sections (58) each capable of supplying recording material the same size as the small-sized recording material contained in the recording material supply section (30) internally incorporated in the image recording device (1).

The small-sized recording material contained in the recording material supply section (30) internally incorporated in the image recording device (1) is, for example, A4 or B5 size. These sizes are used more frequently than the large-sized recording material of A3 or B4 size, and are sometimes used continuously in large quantities.

Users who often use recording material in this way can prepare for continuous use of large quantities of the small-sized recording material by structuring the recording material supply device (2A, 2B) of a parallel arrangement of recording material supply sections (58) equivalent to that internally incorporated in the image recording device.

Accordingly, in addition to the effects obtainable by the respective structures described above, the foregoing structure can provide an image recording system capable of responding to continuous use in large quantity of the small-sized recording material contained in the recording material supply section (30) incorporated within the image recording device.

Further, the image recording system according to the p resent invention may be structured as described above, in which the peripheral devices (2A, 2B, 5, 7, 8, 9, 10, 11, 18, 28) further include an original image reading device (7) which reads an image of an original; and the original image reading device (7) has a width substantially the same as a width of the recording material supply device (2A, 2B).

By providing the original image reading device (7), the system is given the function of copy machine. Accordingly, with this structure, in addition to the effects of the respective structures described above, the image recording system can function not only as a printer, but also as a copy machine.

Further, as discussed above, the image recording system according to the present invention may be structured such that the image recording device (1) is mounted on top of the recording material supply device (2A, 2B), and a recording material post-processing device (5, 10) and an intermediate unit (6) which is an intermediary in transport of small-sized and large-sized recording material to the recording material post-processing device (5, 10) are further provided; the peripheral devices (2A, 2B, 5, 7, 8, 9, 10, 11) include a double-sided transport device (8, 18, 28) which transports small-sized and large-sized recording material from an upper end to a lower end of a transport surface thereof, provided on an opposite side of the image recording device (1) from the recording material post-processing device (5, 10); and switchback transport, for introducing recording material into the double-sided transport device (8, 18, 28), is performed using a first transport channel (93) of the intermediate unit, and the first transport channel (93) is provided with curl correction means (92) for correcting curl of small-sized and large-sized recording material.

With this structure, curl in recording material transported to the recording material post-processing device (5, 10) is corrected by the curl correction means (92) when the recording material passes through the first transport channel (93). Further, since recording material transported to the double-sided transport device (8, 18, 28) mounted on the opposite side from the recording material post-processing device (5, 10) passes through the first transport channel (93) during switchback transport, the curl correction means (92) correct curl of this recording material as well.

Consequently, in addition to the effects obtainable by a structure in which the image recording device (1) is mounted on top of the recording material supply device (2A, 2B), further provided with the recording material post-processing device (5, 10) and an intermediate device (6) which is an intermediary in transport of recording material to the recording material post-processing device (5, 10), a single curl correction means (92) can correct curl both of recording material transported from the image recording device (1) to the recording material post-processing device (5, 10), and of recording material transported from the image recording device (1) toward the double-sided transport device (8, 18, 28).

Incidentally, it is preferable if the foregoing structure is provided with switchback transport means (38) which, after temporarily guiding recording material with an image recorded on one side into the intermediate unit (6), perform switchback transport to introduce the recording material into the double-sided transport unit (8, 18, 28).

Further, as discussed above, the image recording system according to the present invention may be made up of an image recording device (1) having a width which is in keeping with measurements of small-sized recording material, installed on top of a recording material supply device (2A, 2B) having a width which is in keeping with measurements of large-sized recording material, further provided with, as peripheral devices (2A, 2B, 5, 7, 8, 9, 10, 11, 18, 28), a double-sided transport device (18, 28) which transports small-sized and large-sized recording material from an upper end to a lower end of a transport surface thereof, provided on a side of the image recording device (1); and a laterally located recording material post-processing device (9) which receives small-sized and large-sized recording material transported through the double-sided transport device (18, 28), performs predetermined post-processing of the small-sized and large-sized recording material received, and discharges the small-sized and large-sized recording material post-processed, provided on a side of the image recording device (1) so as to cover the double-sided transport device (18, 28). In addition, it is preferable if the laterally located recording material post-processing device (9) occupies at least part of a space below the double-sided transport device (18, 28).

With this structure, since the laterally located recording material post-processing device (9) is provided on the side of the image recording device (1) so as to cover the double-sided transport device (18, 28), members of the laterally located recording material post-processing device (9) such as a control circuit for managing its operation, a power source unit for driving, etc. can be provided, for example, in the part of the laterally located recording material post-processing device (9) not covering the double-sided transport device (18, 28), i.e., the part below the double-sided transport device (18, 28).

Consequently, in addition to the effects obtainable with a structure in which the image recording device (1) is installed on top of the recording material supply device (2A, 2B), installation space of the laterally located recording material post-processing device (9) located to the side of the image recording device (1) can be held to a minimum, thus also holding to a minimum increase of the installation area of the image recording system as a whole.

Further, as discussed above, the image recording system according to the present invention may be made up of an image recording device (1) which records images on recording material, and one or more peripheral devices (2A, 2B, 5, 7, 8, 9, 10, 11, 18, 28) selectively connected to the image recording device (1) according to functions the image recording system is desired to perform; in which the peripheral devices (2A, 2B, 5, 7, 8, 9, 10, 11, 18, 28) include a double-sided transport device (18, 28) which transports recording material from an upper end to a lower end of a transport surface thereof, provided on a side of the image recording device (1); and a laterally located recording material post-processing device (9) which receives the recording material transported through the double-sided transport device (18, 28), performs predetermined post-processing of the recording material received, and discharges the recording material post-processed, provided on a side of the image recording device (1) so as to cover the double-sided transport device (18, 28). In addition, it is preferable if the laterally located recording material post-processing device (9) occupies at least part of a space below the double-sided transport device (18, 28).

With this structure, members of the laterally located recording material post-processing device (9) such as a control circuit for managing its operation, a power source unit for driving, etc. can be provided, for example, in the part of the laterally located recording material post-processing device (9) not covering the double-sided transport device (18, 28), i.e., the part below the double-sided transport device (18, 28). Consequently, installation space of the laterally located recording material post-processing device (9) located to the side of the image recording device (1) can be held to a minimum, thus also holding to a minimum increase of the installation area of the image recording system as a whole.

Further, the image recording system according to the present invention is preferably structured as described above, in which a side of the laterally located recording material post-processing device (9) facing the image recording device (1) has a concave portion (9b) corresponding to a shape of the double-sided transport device (18, 28), and the laterally located recording material post-processing device (9) is positioned by engagement of the concave portion (9b) with the double-sided transport device (18, 28).

With this structure, the laterally located recording material post-processing device (9) is positioned by engagement of the concave portion (9b) of the side facing the image recording device (1) with the double-sided transport device (18, 28) mounted on the side of the image recording device (1). Accordingly, a definite positional relationship between the two devices can be assured without providing a separate positioning mechanism. Further, installation space can be held to a minimum since a separate positioning mechanism is unnecessary.

Consequently, in addition to the effects of the structure described above, the laterally located recording material post-processing device (9) can receive with certainty recording material outputted by the double-sided transport device (18, 28), and increase of the installation area of the image recording system as a whole can also be held to a minimum.

Further, the image recording system according to the present invention is preferably structured as described above, in which the laterally located recording material post-processing device (9) can be separated a distance apart from the double-sided transport device (18, 28); and part of the laterally located recording material post-processing device (9) forms at least part of a transport channel (88b) provided in the double-sided transport device (18, 28).

With this structure, since the laterally located recording material post-processing device (9) can be separated a distance apart from the double-sided transport device (18, 28), and since part of the laterally located recording material post-processing device (9) forms part of the transport channel (88b) of the double-sided transport device (18, 28), that part of the transport channel (88b) formed by the laterally located recording material post-processing device (9) can be opened. Further, it is possible to hold to a minimum the total installation space of the laterally located recording material post-processing device (9) and the double-sided transport device (18, 28) together.

Consequently, in addition to the effects of the structure described above, recording material stuck in the transport channel (88b) of the double-sided transport device (1) can be easily removed, and increase of the installation area of the image recording system as a whole can also be held to a minimum.

Further, the image recording system according to the present invention may be structured as described above, in which the laterally located recording material post-processing device (9) is replaced by a double-sided transport device recording material supply device (11), which forms at least part of a transport channel (88b) provided in the double-sided transport device (18, 28), and supplies recording material to the transport channel (88b).

With this structure, by forming part of the transport channel (88b) of the double-sided transport device (18, 28) using the double-sided transport device recording material supply device (11), which supplies recording material to the double-sided transport device (18, 28), increase of installation space due to provision of the double-sided transport device recording material supply device (11) can be held to a minimum. Consequently, in addition to the effects of the structure described above, recording material can be supplied to the double-sided transport device (18, 28) without greatly increasing the installation of the image recording system as a whole.

An image recording system according to the present invention may be made up of an image recording device (1)

which records images on recording material; a first receiving section (5, 10), which receives recording material with an image recorded thereon discharged by the image recording device (1); a second receiving section (8, 18, 28), which receives recording material with an image recorded thereon discharged by the image recording device (1), provided on an opposite side of the image recording device (1) from the first receiving section (5, 10); and a first receiving section transport channel (93), which transports recording material toward the first receiving section (5, 10); in which the first receiving section transport channel (93) is also used as a first switchback transport channel (93) for introducing recording material into the second receiving section (8, 18, 28), and is provided with curl correction means (92) for correcting curl of recording material.

With this structure, since both recording material discharged from the image recording device (1) to the first receiving section (5, 10) and recording material discharged to the second receiving section (8, 18, 28) pass through the curl correction means (92), curl thereof is corrected. Consequently, a single curl correction means (92) can correct curl both of recording material transported from the image recording device (1) toward the first receiving section (5, 10), and of recording material transported from the image recording device (1) toward the second receiving section (8, 18, 28).

Incidentally, it is preferable if the foregoing structure is provided with switchback transport means which, after temporarily transporting recording material toward the first receiving section (5, 10), perform switchback transport to introduce the recording material into the second receiving section (8, 18, 28).

Further, the image recording system according to the present invention may be structured as described above, further comprising a second switchback transport channel (94) for introducing recording material into the second receiving section (8, 18, 28); and transport channel switching means (91), which switch between the first switchback transport channel (93) and the second switchback transport channel (94) during switchback transport for introducing recording material into the second receiving section (8, 18, 28), provided upstream from the curl correction means (92) in the first receiving section transport channel (93).

With this structure, a transport channel used for switchback transport for introducing recording material into the second receiving section (8, 18, 28) can be switched between the first switchback transport channel (93) provided with curl correction means (92) and the second switchback transport channel (94) not provided with curl correction means (92). Accordingly, it is possible to select whether or not to perform curl correction on recording material transported into the second receiving section (8, 18, 28).

Consequently, in addition to the effects of the structure described above, selection of whether or not to perform curl correction on recording material transported into the second receiving section (8, 18, 28) can be set as desired according to the state of curl of the recording material.

Further, the image recording system according to the present invention may be structured as described above, in which the curl correction means (92) correct curl of recording material by passing the recording material between a pair of curl correction members (92a, 92b) which are pressed together; and the curl correction members (92a, 92b) can be separated a distance apart from each other.

With this structure, when the curl correction members (92a, 92b) making up the curl correction means (92) are pressed together, curl correction is performed on recording material passing therebetween. When the curl correction members (92a, 92b) are separated a distance apart from each other, on the other hand, curl correction is not performed on recording material passing therebetween. Accordingly, it becomes possible to select whether or not to perform curl correction on recording material passing through the curl correction means (92) on its way to the first receiving section (5, 10) or the second receiving section (8, 18, 28).

Consequently, in addition to the effects of the structure described above, selection of whether or not to perform curl correction can be set as desired according to the state of curl of the recording material, both for recording material transported toward the first receiving section (5, 10) and for recording material transported toward the second receiving section (8, 18, 28).

Further, the image recording system according to the present invention may be structured as described above, in which the curl correction means (92) correct curl of recording material by passing the recording material between a pair of curl correction members (92a, 92b) which are pressed together; and force with which the curl correction members (92a, 92b) are pressed together is variable.

With this structure, when the curl correction members (92a, 92b) making up the curl correction means (92) are pressed together with suitable force, curl correction is performed on recording material passing therebetween. When the force with which the curl correction members (92a, 92b) are pressed together is small, on the other hand, curl correction is not performed on recording material passing therebetween. Accordingly, it becomes possible to select whether or not to perform curl correction on recording material passing through the curl correction means on its way to the first receiving section (5, 10) or the second receiving section (8, 18, 28).

Consequently, selection of whether or not to perform curl correction can be set as desired according to the state of curl of the recording material, both for recording material transported toward the first receiving section (5, 10) and for recording material transported toward the second receiving section (8, 18, 28).

A recording material post-processing device according to the present invention receives from an image recording device (1) large-sized recording material and small-sized recording material smaller than the large-sized recording material with an image recorded thereon, performs predetermined post-processing of the large-sized and small-sized recording material received, and discharges the large-sized and small-sized recording material post-processed; the recording material post-processing device including a device main body section (5a, 10a) capable of being provided on an upper surface of a recording material supply device (2A, 2B) having a width which is in keeping with measurements of the large-sized recording material, which is contained therein and supplied to the image recording device (1) thereby, in a parallel arrangement with an image recording device (1) having a width which is in keeping with measurements of the small-sized recording material, also provided on the upper surface of the recording material supply device (2A, 2B).

By use of the recording material post-processing device structured as above, it is easy to realize an image recording system like that described above, provided with a recording material post-processing device (5, 10) which receives from an image recording device (1) recording material with an image recorded thereon, performs predetermined post-processing of the recording material received, and discharges the recording material post-processed.

An intermediate unit according to the present invention is installed on an upper surface (1a) of an image recording device (1) which discharges recording material with an image recorded thereon to the upper surface (1a), and is an intermediary in transport of the recording material with an image recorded thereon toward a recording material post-processing device (5, 10); the intermediate unit including a first transport channel (93) which transports recording material with an image recorded thereon toward the recording material post-processing device (5, 10), and a second transport channel (94) which guides recording material with an image recorded thereon to an upper surface (6a) of an intermediate unit main body (6b) through an opening (95) provided therein.

By use of the intermediate unit structured as above, it is easy to realize an image recording system provided with an intermediate unit like that described above.

Further, the intermediate unit according to the present invention may be structured as described above, in which the first transport channel (93) is also used as a first switchback transport channel in switchback transport for transporting recording material to a peripheral device (8, 18, 28) provided on an opposite side of the intermediate unit main body (6b) from the recording material post-processing device (5, 10), and the first transport channel (93) is provided with curl correction means (92) for correcting curl of the recording material.

With this structure, curl of recording material with an image recorded thereon is corrected by the curl correction means (92) when the recording material passes through the first transport channel (93), and recording material transported to the peripheral device (8, 18, 28) provided on the opposite side of the intermediate unit main body (6b) from the recording material post-processing device (5, 10) is also curl corrected by the curl correction means (92), because during switchback transport of this recording material, it passes through the first transport channel (93), which is also a switchback transport channel.

Consequently, in addition to the effects of the structure described above, a single curl correction means (92) can correct curl both of recording material transported toward the recording material post-processing device (5, 10), and of recording material transported toward the peripheral device (8, 18, 28) provided on the opposite side of the intermediate unit main body (6b) from the recording material post-processing device (5, 10).

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations, provided such variations do not depart from the spirit of the present invention or exceed the scope of the patent claims set forth below.

What is claimed is:

1. An image recording system comprising an image recording device which records images on small-sized recording material and large-sized recording material larger than the small-sized recording material, and one or more peripheral devices selectively connected to said image recording device according to functions the image recording system is desired to perform;

said image recording device internally incorporating a recording material supply section containing the small-sized recording material, and the peripheral devices including a recording material supply device which contains and supplies to said image recording device the large-sized recording material, which has a width which is in keeping with measurements of the large-sized recording material; and said image recording device being structured so that small-sized and large-sized recording material with an image recorded thereon is discharged onto an upper surface of said image recording device, and having a width which is in keeping with measurements of the small-sized recording material, and being installed so that its dimensions in a horizontal plane do not extend beyond dimensions of an upper surface of said recording material supply device.

2. The image recording system according to claim 1, wherein:

the peripheral devices include one or more additional peripheral devices in addition to said recording material supply device; and at least one of said additional peripheral devices is installed so that dimensions in a horizontal plane of at least part of said at least one additional peripheral device do not extend beyond the dimensions of the upper surface of said recording material supply device.

3. The image recording system according to claim 1, wherein:

the peripheral devices include one or more additional peripheral devices in addition to said recording material supply device; and at least one of said additional peripheral devices is installed so that its dimensions in a horizontal plane do not extend beyond the dimensions of the upper surface of said recording material supply device.

4. The image recording system according to claim 1, wherein:

said image recording device is installed on part of the upper surface of said recording material supply device;

the peripheral devices include one or more additional peripheral devices in addition to said recording material supply device; and at least one of said additional peripheral devices is installed on a remaining part of the upper surface of said recording material supply device.

5. The image recording system according to claim 1, wherein:

the peripheral devices include one or more additional peripheral devices in addition to said recording material supply device; and each of said additional peripheral devices is installed so that its dimensions in a horizontal plane do not exceed the dimensions of the upper surface of said recording material supply device.

6. The image recording system according to claim 1, further comprising a discharge tray, wherein:

said image recording device is mounted on top of said recording material supply device, and said discharge tray is attached to said image recording device on a downstream side thereof with respect to a paper discharge direction, extending out horizontally from said upper surface of said image recording device, but without extending beyond the dimensions of the upper surface of said recording material supply device.

7. The image recording system according to claim 1, wherein:

said image recording device is mounted on top of said recording material supply device;

the peripheral devices include a recording material post-processing device which receives small-sized and large-sized recording material outputted by said image recording device with an image recorded thereon, performs predetermined post-processing on the small-sized and large-sized recording material received, and discharges the small-sized and large-sized recording material post-processed; and said recording material post-processing device is mounted on top of said recording material supply device adjacent to said image recording device, on a downstream side thereof with respect to a paper discharge direction.

8. The image recording system according to claim 7, further comprising an intermediate unit, which is an intermediary in transport of the small-sized and large-sized recording material with an image recorded thereon toward said recording material post-processing device, wherein:

said intermediate unit is installed on said upper surface of said image recording device; and said intermediate unit has a first transport channel which transports small-sized and large-sized recording material with an image recorded thereon toward said recording material post-processing device, and a second transport channel which transports small-sized and large-sized recording material with an image recorded thereon toward a recording material receiving section comprising at least in part an upper surface of said recording material post-processing device.

9. The image recording system according to claim 8, wherein:

the peripheral devices include a double-sided transport device which transports small-sized and large-sized recording material vertically downward, provided on a side of said image recording device opposite a side adjacent to said recording material post-processing device; and switchback transport, for introducing small-sized and large-sized recording material into said double-sided transport device, is performed by using said second transport channel of said intermediate unit to temporarily guide small-sized and large-sized recording material with an image recorded on one side into said recording material receiving section.

10. The image recording system according to claim 9, further comprising:

switchback transport means which, after temporarily guiding the small-sized and large-sized recording material with an image recorded on one side into said recording material receiving section, perform switchback transport to introduce the small-sized and large-sized recording material into said double-sided transport unit.

11. The image recording system according to claim 1, wherein:

said recording material supply device is structured of a parallel arrangement of recording material supply sections each capable of supplying recording material the same size as the small-sized recording material contained in said recording material supply section internally incorporated in said image recording device.

12. The image recording system according to claim 1, wherein:

the peripheral devices further include an original image reading device which reads an image of an original; and the original image reading device has a width substantially the same as a width of the recording material supply device.

13. The image recording system according to claim 8, wherein:

the peripheral devices include a double-sided transport device which transports small-sized and large-sized recording material from an upper end to a lower end of a transport surface thereof, provided on an opposite side of said image recording device from said recording material post-processing device; and switchback transport, for introducing small-sized and large-sized recording material into said double-sided transport device, is performed using said first transport channel of said intermediate unit, and said first transport channel is provided with curl correction means for correcting curl of the small-sized and large-sized recording material.

14. The image recording system according to claim 13, further comprising:

switchback transport means which, after temporarily guiding the small-sized and large-sized recording material with an image recorded on one side into said intermediate unit, perform switchback transport to introduce the small-sized and large-sized recording material into said double-sided transport unit.

15. The image recording system according to claim 13, wherein:

said curl correction means correct curl of small-sized and large-sized recording material by passing the small-sized and large-sized recording material between a pair of curl correction members which are pressed together; and said curl correction members can be separated a distance apart from each other.

16. The image recording system according to claim 13, wherein:

said curl correction means correct curl of small-sized and large-sized recording material by passing the small-sized and large-sized recording material between a pair of curl correction members which are pressed together; and force with which said curl correction members are pressed together is variable.

17. The image recording system according to claim 1, wherein the peripheral devices include:

a double-sided transport device which transports small-sized and large-sized recording material from an upper end to a lower end of a transport surface thereof, provided on a side of said image recording device; and a laterally located recording material post-processing device which receives small-sized and large-sized recording material transported through said double-sided transport device, performs predetermined post-processing of the small-sized and large-sized recording material received, and discharges the small-sized and large-sized recording material post-processed, provided on a side of said image recording device so as to cover said double-sided transport device.

18. The image recording system according to claim 17, wherein:

said laterally located recording material post-processing device occupies at least part of a space below said double-sided transport device.

19. The image recording system according to claim 17, wherein:

a side of said laterally located recording material post-processing device facing said image recording device has a concave portion corresponding to a shape of said double-sided transport device, and said laterally located recording material post-processing device is positioned by engagement of said concave portion with said double-sided transport device.

20. The image recording device according to claim 17, wherein:

said double-sided transport device has a transport channel;

said laterally located recording material post-processing device can be separated a distance apart from said double-sided transport device; and part of said laterally located recording material post-processing device forms at least part of said transport channel of said double-sided transport device.

21. The image recording system according to claim 1, wherein the peripheral devices include:

a double-sided transport device having a transport channel, which transports small-sized and large-sized recording material from an upper end to a lower end of said transport channel, provided on a side of said image recording device; and a double-sided transport device recording material supply device, which forms at least part of said transport channel of said double-sided transport device, and supplies recording material to said transport channel.

22. An image recording system comprising an image recording device which records images on recording material, and one or more peripheral devices selectively connected to said image recording device according to functions the image recording system is desired to perform, the peripheral devices including:

a double-sided transport device which transports recording material from an upper end to a lower end of a transport surface thereof, provided on a side of said image recording device; and a laterally located recording material post-processing device which receives recording material transported through said double-sided transport device, performs predetermined post-processing of the recording material received, and discharges the recording material post-processed, provided on a side of said image recording device so as to cover said double-sided transport device.

23. The image recording system according to claim 22, wherein:

said laterally located recording material post-processing device occupies at least part of a space below said double-sided transport device.

24. The image recording system according to claim 22, wherein:

a side of said laterally located recording material post-processing device facing said image recording device has a concave portion corresponding to a shape of said double-sided transport device, and said laterally located recording material post-processing device is positioned by engagement of said concave portion with said double-sided transport device.

25. The image recording device according to claim 22, wherein:

said double-sided transport device has a transport channel;

said laterally located recording material post-processing device can be separated a distance apart from said double-sided transport device; and part of said laterally located recording material post-processing device forms at least part of said transport channel of said double-sided transport device.

26. An image recording system comprising an image recording device which records images on recording material, and one or more peripheral devices selectively connected to said image recording device according to functions the image recording system is desired to perform, the peripheral devices including:

a double-sided transport device having a transport channel, which transports recording material from an upper end to a lower end of said transport channel, provided on a side of said image recording device; and a double-sided transport device recording material supply device, which forms at least part of said transport channel of said double-sided transport device, and supplies recording material to said transport channel.

27. An image recording system comprising:

an image recording device which records images on recording material;

a first receiving section, which receives recording material with an image recorded thereon discharged by said image recording device;

a second receiving section, which receives recording material with an image recorded thereon discharged by said image recording device, provided on an opposite side of said image recording device from said first receiving section; and a first receiving section transport channel, which transports recording material toward said first receiving section;

said first receiving section transport channel also being used as a first switchback transport channel for introducing recording material into said second receiving section, and being provided with curl correction means for correcting curl of the recording material, and further comprising:

a second switchback transport channel for introducing recording material into said second receiving section; and transport channel switching means, which switch between said first switchback transport channel and said second switchback transport channel during switchback transport for introducing recording material into said second receiving section, provided upstream from said curl correction means in said first receiving section transport channel.

28. An image recording system comprising:

an image recording device which records images on recording material;

a first receiving section, which receives recording material with an image recorded thereon discharged by said image recording device;

a second receiving section, which receives recording material with an image recorded thereon discharged by said image recording device, provided on an opposite side of said image recording device from said first receiving section; and a first receiving section transport channel, which transports recording material toward said first receiving section;

said first receiving section transport channel also being used as a first switchback transport channel for introducing recording material into said second receiving section, and being provided with curl correction means for correcting curl of the recording material, and wherein:

said curl correction means correct curl of recording material by passing the recording material between a pair of curl correction members which are pressed together; and said curl correction members can be separated a distance apart from each other.

29. An intermediate unit which is installed on an upper surface of an image recording device which discharges recording material with an image recorded thereon to said upper surface, and is an intermediary in transport of recording material with an image recorded thereon toward a recording material post-processing device;

said intermediate unit including a first transport channel which transports recording material with an image recorded thereon toward said recording material post-processing device, and a second transport channel which guides recording material with an image recorded thereon to an upper surface of an intermediate unit main body through an opening provided therein, wherein said first transport channel comprises curl correction means for correcting curl of the recording material by passing the recording material between a pair of mutually pressed curl correct members which can be separated from each other.

30. The intermediate unit according to claim 29, wherein:

said first transport channel is also used as a first switchback transport channel in switchback transport for transporting recording material to a peripheral device provided on an opposite side of said intermediate unit main body from said recording material post-processing device.

31. An image recording system comprising an image recording device which records images on recording material, and one or more peripheral devices selectively connected to said image recording device according to functions the image recording system is desired to perform;

said image recording device being capable of discharging the recording material with an image recorded thereon via at least two sides thereof;

said peripheral devices including a first recording material post processing device and a second recording material post processing device that perform different post processes on the recording material with an image recorded thereon; and said first and second recording material post processing devices being disposed on different sides of the image recording device.

32. The image recording system as defined in claim 31, wherein:

said peripheral devices further include a recording material supply device for supplying recording material to said image recording device; and said image recording device and at least either said first recording material post processing device or said second recording material post processing device are installed so that dimensions in a horizontal plane of said image recording device and at least either said first recording material post processing device or said second recording material post processing device do not extend beyond the dimensions of the upper surface of said recording material supply device.

33. The image recording system as defined in claim 31, wherein:

said peripheral devices further include an original image reading device for reading original images; and said original image reading device is installed so as to fit within a width that is almost equal to a width of said recording material supply device.

* * * * *